United States Patent
Carrasco et al.

(10) Patent No.: US 9,735,579 B2
(45) Date of Patent: Aug. 15, 2017

(54) DEMAND SHAPING IN AN ELECTRICAL POWER GRID

(71) Applicant: Siemens Corporation, Iselin, NJ (US)

(72) Inventors: Rodrigo Carrasco, New York, NY (US); Ioannis Akrotirianakis, Princeton, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/772,096

(22) PCT Filed: Feb. 25, 2014

(86) PCT No.: PCT/US2014/018156
§ 371 (c)(1),
(2) Date: Sep. 2, 2015

(87) PCT Pub. No.: WO2014/137655
PCT Pub. Date: Sep. 12, 2014

(65) Prior Publication Data
US 2016/0020609 A1    Jan. 21, 2016

Related U.S. Application Data

(60) Provisional application No. 61/773,996, filed on Mar. 7, 2013.

(51) Int. Cl.
*H02J 3/14* (2006.01)
*G05B 15/02* (2006.01)
*G06Q 50/06* (2012.01)
*H02J 3/00* (2006.01)

(52) U.S. Cl.
CPC ............... *H02J 3/14* (2013.01); *G05B 15/02* (2013.01); *G06Q 50/06* (2013.01); *H02J 2003/007* (2013.01); *H02J 2003/146* (2013.01); *Y02B 70/3225* (2013.01); *Y04S 20/222* (2013.01); *Y04S 20/224* (2013.01)

(58) Field of Classification Search
None
See application file for complete search history.

(56) References Cited

U.S. PATENT DOCUMENTS

| | | | |
|---|---|---|---|
| 2010/0324962 A1* | 12/2010 | Nesler | G01R 21/133 705/7.36 |
| 2011/0208369 A1 | 8/2011 | Baek | |
| 2012/0004786 A1* | 1/2012 | Lo | G05B 15/02 700/296 |
| 2012/0053740 A1* | 3/2012 | Venkatakrishnan | G06Q 50/06 700/291 |
| 2013/0144451 A1* | 6/2013 | Kumar | G05B 13/02 700/291 |
| 2013/0285446 A1* | 10/2013 | Chow | H02J 3/32 307/18 |

OTHER PUBLICATIONS

PCT International Search Report mailed Aug. 7, 2014 corresponding to PCT International Application No. PCT/US2014/018156 filed Feb. 25, 2014 (12 pages).
International Conference on Smart Grid Communications, Oct. 2010, pp. 397-402, XP002727703.

* cited by examiner

*Primary Examiner* — Ryan Jarrett

(57) ABSTRACT

A method (100) for demand shaping through load shedding and shifting in an electrical smart grid.

11 Claims, 14 Drawing Sheets

DEMAND SHAPING IN AN ELECTRICAL POWER GRID

CROSS-REFERENCE TO RELATED APPLICATIONS

This application claims the benefit of Provisional U.S. Patent Application Ser. No. 61/773,996, entitled "Robust Demand Shaping through Load Shedding and Load Shifting with a Two-Level Market", filed in the name of Rodrigo Carrasco, Ioannis Akrotirianakis and Amit Chakraborty on Mar. 7, 2013, the disclosure of which is also hereby incorporated herein by reference.

FIELD OF INVENTION

The present invention relates to the control of electricity flows in an electrical power network. More particularly, the present invention relates to the control of smart electrical power networks (or grids).

BACKGROUND OF THE INVENTION

The electrical power grid is experiencing important changes. First, introducing new power plants and enlarging the grid is becoming more expensive and complicated. Second, the introduction of more renewable power sources, which have a much higher output variance, will make it even harder to control and predict the state of the system. In this environment, a smart grid, where not only energy but also data is transmitted, appears to be a solution in the right direction as it gives further control to all parties involved in the various aspects of the power grid: generation, transmission, distribution, and consumption. Smart grids are the evolution of our current electrical grid and promise to solve many of the current limitations like managing sources with higher variability and increase security and reliability. But in order to use smart grids appropriately, new mechanisms and processes need to be put in place to control the flow of energy and achieve the promised goals. Demand shaping mechanisms are among the most crucial ones, since they allow the grid operators to control and shape the demand, reduce costs and peak to average consumption, as well as increase reliability and better control blackouts and brownouts.

The current smart grid approaches and related work may be organized generally into two main categories: demand response (DR) methods and grid/market modeling. Several different methods for demand response have been proposed in the literature. A good summary of the different DR approaches is presented in an article by M. Albadi and E. El-Saadany entitled "Demand response in electricity markets: An overview", Power Engineering Society (2007), pp. 1-5 and in their follow up article entitled "A summary of demand response in electricity markets", Electric Power Systems Research 78, No. 11 (November 2008), pp. 1989-1996. An additional, interesting source of DR approach results can be found in an article by J.-H. Kim and A. Shcherbakova entitled "Common failures of demand response", Energy 36, No. 2 (February 2011), pp. 873-880, in which the authors list several implementations and trials done as well as the shortcomings they have observed, shedding light into which methods are better for controlling demand level.

The simplest approach of demand response methods is the direct control, which basically uses the ideas of dynamic demand implemented in Great Britain. An elaborate example of that approach appears in an article by G. Tejeda and A. Cipriano entitled "Direct Load Control of HVAC systems using Hybrid Model", Predictive Control (2012), in which the authors control a HVAC (heating, ventilation and air conditioning) load directly. Their approach comes from the control theory perspective but, if the objective functions are changed for other economic quantities, a control system could be implemented that minimizes a desired metric, like generation cost or peak to average ratio (PAR), for electrical power grid purposes.

In terms of price/incentive based mechanisms, there are three main methods in demand response. The first one focuses on demand shedding as shown in an article by L. Chen, N. Li, S. H. Low and J. C. Doyle, entitled "Two Market Models for Demand Response in Power Networks", In 2010 First IEEE International Conference on Smart Grid Communications, (October 2010), pp. 397-402, IEEE. In this method, users will shed part of their demand, and the level of that shedding depends on the price offered by the generator or utility company. Thus, the results of the above-referenced article point towards how to compute the equilibrium prices such that a known amount d of demand can be shed. The authors consider that users shed demand linearly with prices, which could be true for small values of d but as d increases their model certainly will not work.

The second method is demand-source balancing. This method makes sure that the demand adapts to the current generation levels, something especially important in the presence of variable energy sources like wind or sun Several different methods are proposed in the literature (for example, in an article by A. D. Dominguez-Garcia and C. N. Hadjicostis entitled "Distributed algorithms for control of demand response and distributed energy resources", In Decision and Control (2011), pp. 27-32; in an article by P. Loiseau, G. Schwartz and J. Musacchio, entitled "Congestion pricing using a raffle-based scheme", In Network Games, Control and Optimization, No. 2, (2011) pp. 1-8; in an article by A.-H. Mohsenian-Rad, V. W. S. Wong, J. Jatskevich, R. Schober, and A. Leongarcia, entitled "Autonomous Demand-Side Management Based on Game-Theoretic Energy Consumption Scheduling for the Future Smart Grid", IEEE Transactions on Smart Grid 1, No. 3 (December 2010), pp. 320-331; and in an article by F. Partovl, M. Nikzad, B. Mozafari, and A. M. Ranjbar, entitled "A stochastic security approach to energy and spinning reserve scheduling considering demand response program", Energy 36, No. 5 (May 2011), pp. 3130-3137). One of the most interesting methods is the one proposed by the Mohsenian-Rad, et al. article above since the authors arrive to a distributed method that can balance the demand level given the generation output with the objective of minimizing the generation cost.

The third main demand response method is demand shifting. This is the one most directly related to the problem of demand shaping since in this case the users agree to shift their loads in time, according to a price signal by the utility company. An example of such an approach appears in an article by M. Kraning, E. Chu, J. Lavaei, S. Boyd, and W. D. April, entitled "Message Passing for Dynamic Network Energy Management" (2012) in which users give their preferences and restrictions for their different appliances (like washing machines, electric vehicles, etc.) and then, through a distributed algorithm, the demand level is defined to achieve a certain control objective. The main issue with this method is that it is not truthful (i.e. the users can cheat the system by not revealing their true requirements and thus obtain benefits above the social optimum). Also, there are some privacy concerns in terms of the information the users must share. Still, it is a very interesting approach to see how loads can be shifted around.

More related to the methodology side, one article (by W. Chen, D. Huang, A. A. Kulkarni, J. Unnikrishnan, Q. Zhu, P. Mehta, S. Meyn, and A. Wierman entitled "Approximate dynamic programming using fluid and diffusion approximations with applications to power management", Proceedings of the 48th IEEE Conference on Decision and Control (CDC), (December 2009), pp. 3575-3580) discusses one methodology that can be used to compute optimal solutions of complex models. This method could be interesting if there is a need to find an equilibrium point or a price value, and, especially, if there is a focus on using stochastic models to represent a system.

The literature also discusses how to model the power grid and more importantly, how to model or find solutions for the market that works over the grid. It is important to remember that this market basically works in three levels: a long-term market, day-ahead market, and real time market. In the long term market generators and large consumers or utility companies sign agreements for power delivery many weeks, months, or even years ahead. Then in the day-ahead market utility companies purchase whatever additional energy they might need given the much better forecasts they have for the next day, as well as the reserve required. The third market is the real time market or spot market, which is between 5 to 10 minutes ahead of the actual real-time demand and it is used to match the demand exactly.

In one article, the authors highlight the difficulties the future grid will have, which is important since some of the new metrics a future smart grid might be of interest while solving current issues with demand shaping (see the article by M. Negrete-Pincetic and S. Meyn, entitled "Intelligence by Design for the Entropic Grid", pp. 1-8). One of the most interesting and useful models for the energy market is the one developed in a document by L-K. Cho and S. P. Meyn, entitled "Efficiency and marginal cost pricing in dynamic competitive markets with friction", Theoretical Economics 5, No. 2 (2010), pp. 215-239 in which the authors formulate the general model and are able to compute equilibrium points given certain simplifications. The main takeaway of this document is that, by adding friction to the market model (which appears due to the ramp-up constraints given by generators), it is now possible to achieve solutions with price volatility similar to the ones observed in real energy markets. This is a key point since the first step in most other papers in the area is to simplify the model by eliminating ramp-up requirements, and thus those results could be far off from reality. In follow-up papers, the respective authors further analyze their models with additional components, such as variable energy sources (see the papers by S. Meyn, M. Negrete-Pincetic, G. Wang, A. Kowli, and E. Hafiee-poorfard entitled "The value of volatile resources in electricity markets", 49th IEEE Conference on Decision and Control (CDC), (December 2010), pp. 1029-1036; by G. Wang, A. Kowli, M. Negrete-Pincetic, E. Shafreepoorfard and S. Meyn entitled "A Control Theorist s Perspective on Dynamic Competitive Equilibria in Electricity Markets", In I FAC, (2011); and by G. Wang, M. Negrete-Pincetic, A. Kowli, S. Meyn, and U. V. Shanbhag, entitled "Dynamic Competitive Equilibria in Electricity Markets", In Control and Optimization Theory Jor Electric Smart Grids, 2011, pp. 1-28). These are very interesting results since they are able to model the system considering that both demand and generation of energy are stochastic processes, which is useful for other approaches. Another article analyzes the system in terms of its reliability, which is something that might also be of interest (see the article by M. Chen, L-K. Cho, and S. P. Meyn, entitled "Reliability by design in distributed power transmission networks", Automatica 42, No. 8 (August 2006), pp. 1267-1281).

Another approach for modeling this market is given in an article by S. Worgin, B. F. Hobbs, D. Ralph, E. Centeno, and J. Barquin, entitled "Open versus closed loop capacity equilibria in electricity markets under perfect and oligopolistic competition", pp. 1-36, in which the authors not only analyze the perfect competition setting but also the oligopolistic one in which energy producers are not price takers as in most of the rest of the literature.

Finally, how to add variable sources to the energy market model can be found in an article by J. Nair, S. Adlakha, and A. Wierman, entitled "Energy Procurement Strategies in the Presence of Intermittent Sources", 2012. The most interesting result in this article is how they are able to compute procurement strategies when the energy sources have high variability while at the same time being able to model the three levels of the energy market. They do it by adding error to the forecasts for each of the different markets which could be useful for other forecasting methodologies.

SUMMARY OF THE INVENTION

The above problems are obviated by the present invention which provides a method for controlling the flow of energy in an electrical power grid, comprising obtaining an optimal load shedding profile for a user of the grid; obtaining an optimal billing structure and an optimal load shifting profile for the user; iterating the steps of obtaining an optimal load shedding profile and obtaining an optimal billing structure and optimal load shifting profile until convergence is achieved; and controlling the energy consumption of the user based on the optimal load shedding profile, optimal billing structure, and optimal load shifting profile. The step of obtaining an optimal load shedding profile may utilize a known billing structure and a known load shifting profile for each user of the grid. In such case, the step of obtaining an optimal load shedding profile may be performed without express information of load preferences of each user of the grid. Each of the steps of obtaining an optimal load shedding profile and obtaining an optimal billing structure and an optimal load shifting profile may be a solution to a robust convex optimization problem.

The present invention also provides a method for demand shaping through load shedding and load shifting in a electrical power smart grid, comprising directly controlling the load of a user to time shift part of the load demand of the user; providing energy purchase price incentives to the user to control the level of shedding part of the load demand of the user; and determining how much energy to purchase on each of the day-ahead market and the real-time market to cover the load demand of the user after load shifting and load shedding. The step of directly controlling the load of a user may comprise calculating an optimal load shifting profile of the user. In such case, the step of calculating an optimal load shifting profile of the user may comprise utilizing a robust optimization problem that takes into account that a user load demand level and energy purchase prices are unknown stochastic processes. The step of providing energy price incentives to the user may comprise calculating an optimal load shedding profile of the user. In such case, the step of calculating an optimal load shedding profile of the user may comprise utilizing a robust optimization problem that takes into account user load demand level and energy purchase prices are unknown stochastic processes.

The present invention may also provide a method of controlling the energy demand of a user of an electrical power network, comprising determining an optimal amount of user energy demand to shed and a price incentive required to achieve said optimal amount; determining a billing structure and an optimal amount of user energy demand to time-shift; repeating the first and second method steps until an equilibrium is achieved; and controlling the energy demand of the user based the determined optimal amount of user energy demand to shed, price incentive required to achieve said optimal amount, billing structure, and optimal amount of user energy demand to time-shift. The step of determining the optimal amount of user energy demand to shed may comprise formulating and solving an optimization problem using a known billing structure and a known user consumption for shiftable loads. In such case, the step of formulating and solving may comprise utilizing standard convex optimization techniques to solve the optimization problem in the case that energy price incentives are set by a party other than a network operator. Alternatively, the step of formulating and solving may comprise setting a price offer for the user and re-formulating and solving the re-formulated optimization problem with user preferences to load shedding in the case that energy price incentives are set by a network operator. The step of determining a billing structure and an optimal amount of user energy demand to time-shift may comprise formulating and solving an optimization problem based on results for calculating an optimal amount of user energy demand to shed and a price incentive required to achieve said optimal amount. In such case, the step of formulating and solving may comprise formulating and solving respective billing structures for each of user shiftable plus sheddable load and user non-moveable load using a fixed utility ratio. Further, the step of formulating and solving respective billing structures may comprise re-formulating and solving re-formulated optimization problem to obtain an optimal amount of user energy demand to time-shift.

The present invention may also provide a control system for an electrical power network, comprising a controller that shapes the electricity demand of users by determining electricity purchase prices and billing structures in an iterative manner to achieve an equilibrium and by determining the allocation of electricity demand for each user given the determined electricity purchase prices and billing structures.

The present invention may also provide a smart electrical power network that provides electricity to users and communicates data between its various components to control the flow of electricity, comprising a control system that is adapted to shape user electricity demand by simultaneously shifting and shedding user electricity demand and by procuring electricity provided to users from a two-stage market with a day-ahead market (DAM) and a real-time market (RTM).

Advantageously, the present invention provides a new mechanism to give further control of the power flow to utility companies, allowing them to shape the user demand in order to minimize the costs of procuring that energy.

DESCRIPTION OF THE DRAWINGS

For a better understanding of the present invention, reference is made to the following description of an exemplary embodiment thereof, and to the accompanying drawings, wherein:

FIG. 3l is a chart of the procurement strategy resulting from the use of the method of FIG. 2 in a simulation comparison with a base case.

DETAILED DESCRIPTION

Figure 1:
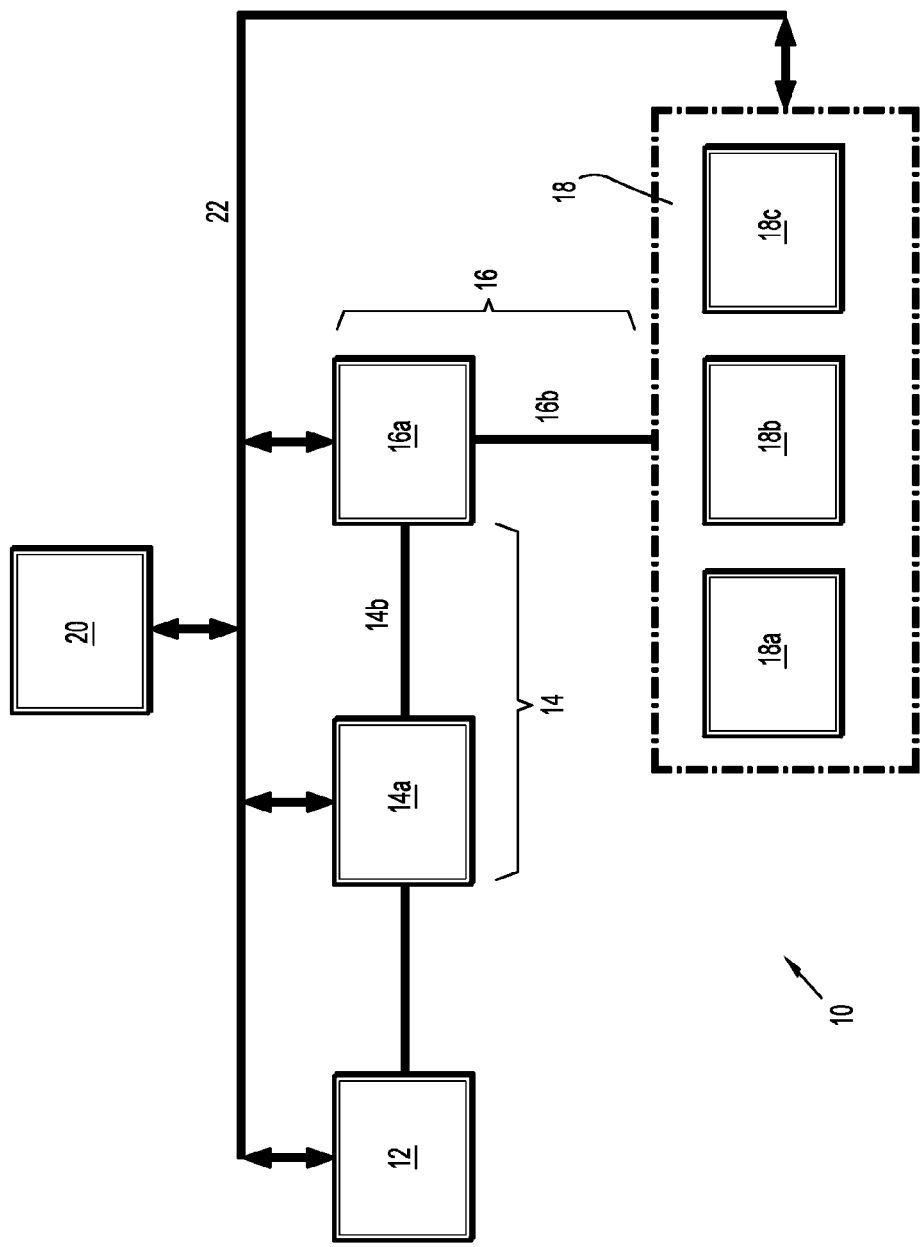
FIG. 1 is a block diagram of a smart electrical power network (simplified)

FIG. 1 is a block diagram of a typical smart power network 10 (simplified) that operates to provide intelligent control and two-way communication among the various network 10 components. The network 10 comprises a generating station(s) 12 that generates electricity/electrical power from an energy source, such as a renewable source (e.g., water, wind, etc.) or a non-renewable source (e.g., coal, natural gas, etc.). The generating station 12 may be configured in many ways and may utilize a combination of various energy sources. The generating station 12 may also utilize energy that was stored for later use. The network 10 also comprises a transmission system 14 that converts the generated electrical power into high voltage power (via a transmission substation 14a) and transfers the high voltage power over a long distance (via electrical transmission lines 14b) to a distribution system 16. The distribution system 16 (via a power substation 16a) converts the high voltage power into power at different lower voltages and splits, or distributes, these lower-voltage power flows off in multiple directions. The distribution system 16 may further modulate and regulate the lower-voltage power flows. Ultimately, the distribution system 16 transfers the distributed power (via distribution lines 16b) to electricity consumers or users 18. The users 18 are typically categorized as residential users 18a, commercial users 18b, and industrial users 18c. In many locations, the entities that generate electricity are separate from the entities that locally distribute electricity (such as a local utility company) so that the local distributors (with their associated distribution systems 16) may also be categorized as a user though not a final or end user (or customer). In some network 10 configurations, the distribution system 16 may also transfer the distributed power to sub-distribution systems (not shown) that further distribute the electricity to final or end users 18.

Each of the network 10 components will comprise and utilize appropriate equipment (for example, sensors, controls, computers, automation, smart meters, etc.) that operates to implement the "smart" functionality of the network 10. The network 10 also comprises an operations center 20 that permits intelligent management and control of the various network 10 components and the overall network 10. The operations center 20 comprises a two-way communications network 22 to connect to the various network 10 components for gathering and acting on information. The operations center 20 also comprises a computer system 24 to provide, among other functions, monitoring, reporting, supervising, and intelligence functions for managing and controlling the various network 10 components and the overall network 10.

Figure 2:
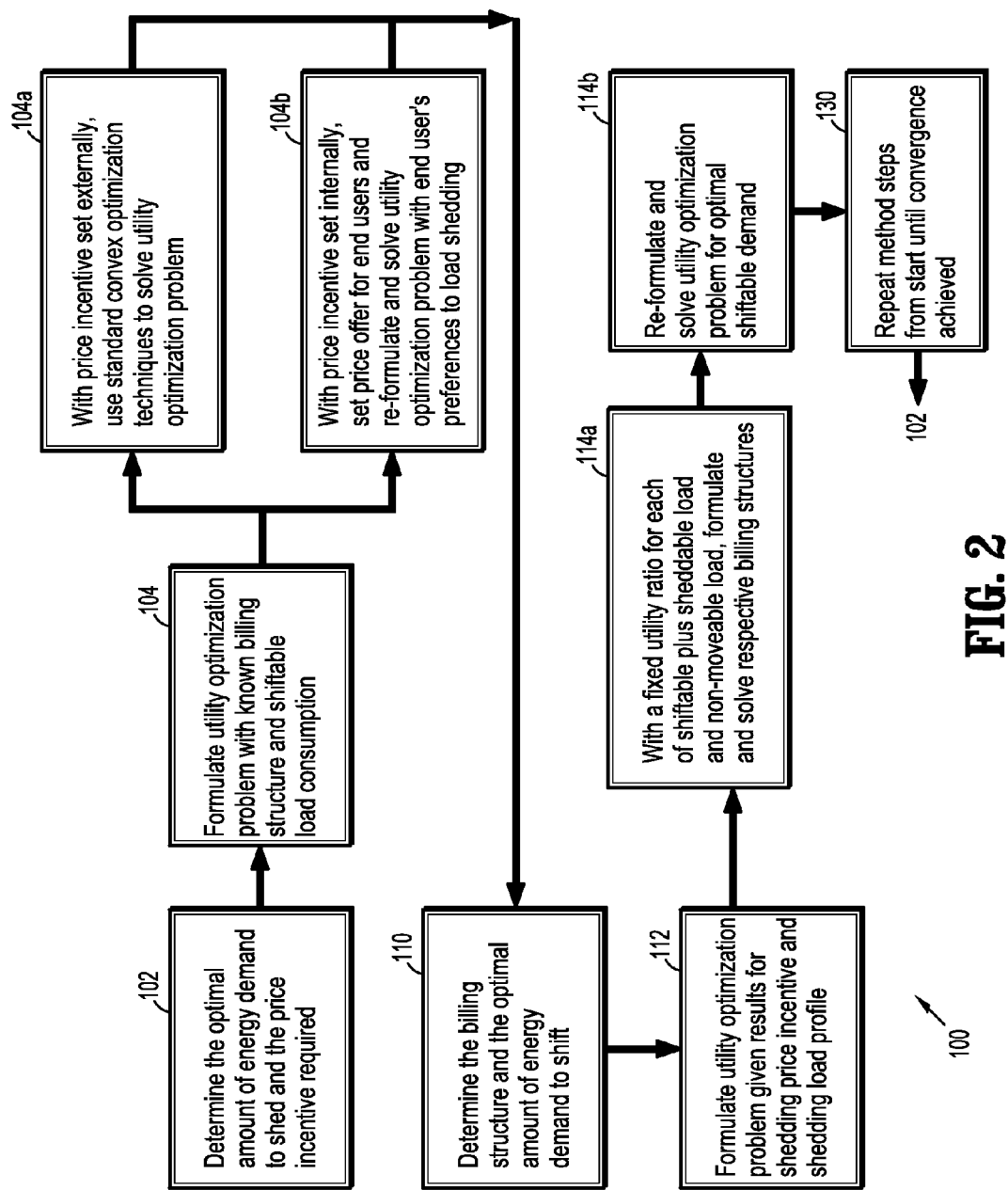
FIG. 2 is a schematic representation of a control method implemented in accordance with the present invention.

The various components of the network 10 are well understood smart grid components. However, the computer system 24 of the operations center 20 is also adapted to permit the network 10 to operate and to implement methods in accordance with the present invention. FIG. 2 is a schematic representation of a control method 100 implemented in accordance with the present invention.

As will be explained in more detail below, the control method 100 is a two step iterative process. In the first step, the load shedding problem is solved by assuming a known billing structure and a load shifting profile for each user/customer. This is done without knowing explicitly the preferences of each user, but still reaching a solution that is optimal for them. The second step uses this result to find the optimal billing structure and load shifting profile. The method 100 iterates between these two steps, reducing the cost of the solution at each step and thus reaching optimality. Instead of solving a complex optimization problem, the method 100 breaks the problem into two simpler robust convex optimization problems that can be even solved in a distributed fashion, thus reducing data transmission and processing requirements.

The framework for methods and systems of the present invention, including the above control method 100, is described as follows. The objective is to build a mechanism where a utility company has direct control of part of the energy consumption of their final customers given the energy they can procure from generators in the market. The present invention considers that the utility company has two tools to control the energy demand: demand shifting and demand shedding, and, further, that it procures the energy it delivers from a two-stage market with a day-ahead market (DAM) and a real-time market (RTM). Currently, there are no methods or systems that involve two different mechanisms simultaneously to shape the demand, nor one that accounts for the energy procurement in a two-level market.

In formulating a demand model, the present invention assumes that the utility company can monitor and control each individual customer, or cluster of customers, and that these customers can categorize their energy consumption in three different groups: loads that can be shed, those that can be shifted, and those that can neither be shed nor shifted, i.e., the non-movable loads. Although it sounds reasonable that the consumption of each of the different client's appliances are assigned to a single load category, it is important to note that there are many cases in which this is not the case. For example, take the energy consumption of an air conditioning (A/C) unit. The energy consumption level required for the A/C unit to give a minimum level of comfort could be categorized as a non-moveable load, whereas the additional load required to get to the current temperature desired by the customer can be categorized as a sheddable one. The present invention also assumes that the time window the utility company wants to optimize can be divided into T equal-sized time steps, and, without loss of generality, it assumes T to be one day.

Continuing with the model, let $q_{it}$, with $i=\{1, \ldots, n\}$ and $t=\{1, \ldots, T\}$ denote the total load of user i at time-step t; and thus $q_i=\{q_{i1} \ldots q_{iT}\}$ denotes the total demand profile for user i for that one day. At each time-step t, the demand of user i is composed by a sheddable demand $q_{it}^{(d)}$, a shiftable demand $q_{it}^{(s)}$, and a non-sheddable, non-shiftable demand $q_{it}^{(n)}$, i.e., $q_{it}=q_{it}^{(d)}+q_{it}^{(s)}+q_{it}^{(n)}$.

As noted above, the sheddable demand is the part of the user's demand that the utility company can shed, making the user incur a personal loss of value. For example, reducing the number of lights used to light an area or increasing the target temperature of the A/C unit will drop the total consumption, bringing certain levels of discomfort to the user. In all these cases, the demand is not shifted/postponed to a different time.

Thus, let $y_{it}$ denote the amount of load user i sheds at time t, and $y_i$ denote the shedding profile vector for user i. Given that at time-step t user i has a sheddable load of $q_{it}^{(d)}$ (i.e., the maximum amount of sheddable load) then it follows that $y_{it} \leq q_{it}^{(d)}$. In addition, let $D_i(y_{it})$ denote the discomfort cost for user i for shedding a load $y_{it}$, with $D_i: \mathbb{R}_{30} \to \mathbb{R}_+$. To incentivize this shedding, the utility company gives a compensation of $p_{it}^{(d)}$ to user i at time-step t per unit of load shed. Given the incentive $p_{it}^{(d)}$ per unit of load, user i will decide to shed an amount $y_{it}=S_i(p_{it}^{(d)})$, with $S_i: \mathbb{R}_+ \to \mathbb{R}_+$. In the article by L. Chen, N. Li, S. H. Low and J. C. Doyle referenced above, the authors use a similar model where they assumed that the discomfort function $D_i(y_{it})$ is a continuous, increasing, strictly convex function, with $D_i(0)=0$, and that the shedding function is of the form $y_{it}=S_i(p_{it}^{(d)})=a_i p_{it}^{(d)}$ where $a_i$ is a user-dependent parameter.

As noted above, the shiftable demand is the part of the client's demand that can be shifted during the day. Items like washing machines, dish washers, and charging electric vehicles fall in this category since there is a window of time for using these machines and not a single specific point in the day. All these appliances can be used in a certain interval within the T time-step window. Since the shiftable demand cannot be shed, the total shiftable demand for user i has a fixed value $\Sigma_t q_{it}^{(s)} = \hat{q}_i^{(s)}$. The shiftable demand is composed by the consumption requirements of m different appliances, where the consumption of appliance j of user i at time t is given by $x_{ijt}$ and the time profile of the appliance is denoted by $x_{ij}$. Thus, at any given point in time the total consumption of user i is given by $q_{it}^{(s)} = \Sigma_j x_{ijt}$.

The total consumption of an appliance will be a given value denoted by $\Sigma_t x_{ijt} = \hat{x}_{ij}$, with a maximum value of $\bar{x}_{ij}$ and a minimum of $\underline{x}_{ij}$ at any given time-step t. For every appliance j, user i sets a time window $[\alpha_{ij}, \beta_{ij}]$ in which the user i requires the appliance to run. For example, an electric vehicle could charge for 3 hours at any point between 10:00 p.m. and 7:00 a.m. This also implies that $x_{ijt}=0$, $\forall t \notin [\alpha_{ij}, \beta_{ij}]$. In the article by A.-H. Mohsenian-Rad, et al. referenced above, the authors use a similar model for shifting user loads to achieve demand response. They also add a minimum stand-by requirement for $x_{ijt}$, but since that can be considered as a non-moveable consumption the present framework adds that to $q_{ijt}^{(n)}$ and keeps only the shiftable portion in $x_{ijt}$.

The non-moveable demand $q_{it}^{(n)}$, as its name suggests, is the part of the demand that cannot be modified or has not been programmed ahead. The user requires that amount of energy at that specific time. Examples of this are the demand of a refrigerator at the lowest viable temperature setting or the on position in the A/C unit. Given that this energy consumption is not necessarily known ahead, $q_i^{(n)}$ can be considered as a stochastic process. Further, it can assumed that the user, or at least its smart meter, has some forecast $\tilde{q}_i^{(n)}$ of the non-moveable demand for the whole time-window at the beginning of the period. Using the ideas in the article by S. Meyn, M. Negrete-Pincetic, G. Wang, A. Kowli, and E. Hafieepoorfard referenced above, the error between the meter's forecast and the real static consumption $\hat{q}_i^{(n)}$, i.e., $\epsilon_i^{(n)} = \tilde{q}_i^{(n)} - \hat{q}_i^{(n)}$, can be modeled as a driftless Brownian motion with variance $\sigma_i^{(n)}$.

The demand model also addresses the billing system. At time-step t, user i is billed an amount $B_{it}^S(q_{it})$ by the utility company, where $B_{it}^S(q_{it}): \mathbb{R}_+ \to \mathbb{R}_+$. In order to incentivize customers to set part of their demand as shiftable or sheddable demand, these loads are charged with a different billing structure $B_{it}^f(q_{it})$, where $B_{it}^f(q_{it}): \mathbb{R}_+ \to \mathbb{R}_+$. Since the utility company will be able to control these loads directly, it is assumed that the billing structure does not depend on t, i.e., $B_{it}^f(q_{it}) = B_t^f(q_{it})$, $\forall t$ ($\forall$ being a universal quantifier signifying "given any" or "for all").

In formulating the procurement model, the utility company must be able to satisfy the total demand $Q_t = \Sigma_i q_{it}$ at every time-step t, and thus deliver a demand profile $Q = [Q_1 \ldots Q_T]$. The utility company satisfies this demand by procuring this energy from a two-stage market composed by a day-ahead market (DAM) whose purchases are closed a day in advance of the actual demand, and a real-time market (RTM) that clears close to real-time. The prices in these two markets can differ significantly. Let $C_t^d(Q_t)$, with $C_t^d(Q_t): \mathbb{R}_+^2 \to \mathbb{R}_+$ denote the total cost of procuring energy from the DAM and delivering to satisfy a demand of $Q_t$ at time t. Similarly, let $C_t^S(Q_t)$, with $C_t^S(Q_t): \mathbb{R}_+^2 \to \mathbb{R}_+$ denote the total cost of procuring energy from the RTM and delivering to satisfy a demand of $Q_t$ at time t. In general, we can assume that $C_t^d(Q_t) \leq C_t^S(Q_t)$ with $C_t^d(Q_t)$ being known by the utility company and $C_t^S(Q_t)$ being an unknown stochastic process that represents the variation in prices that the RTM shows.

Within the framework described above, there are several different problems of interest for a utility company that can be addressed. The first is the cost/revenue problem. Given the cost of procuring and delivering load, $C_t^d(Q_t)$ and $C_t^S(Q_t)$, a billing structure $B_{it}^f(q_{it})$ and $B_{it}^S(q_{it})$, $\forall i$, t and incentive prices per unit of load $p_i^{(d)}$, $\forall i$, what is the optimal load delivery that maximizes the utility company's revenue and satisfies the demand. This is similar to the problems posed in the articles by A.-H. Mohsenian-Rad et al. and L. Chen, N. Li, S. H. Low and J. C. Doyle, where the billing structure $B_{it}^f(q_{it})$ is given and the authors are interested in computing the demand pattern Q that maximizes the revenues.

Another is the PAR problem that seeks to minimize the asset requirements to deliver peak-energy, which can be achieved by minimizing the peak-to-average ratio (PAR). This problem can be written as follows (equation 1):

$$\min_{X,Y} \max_t \frac{T Q_t}{\sum_t Q_t} \quad (1)$$

s.t.:

$$Q_t = \sum_i q_{it}, \quad \forall t,$$
$$q_{it} = (q_{it}^{(d)} - y_{it}) + q_{it}^{(s)} + \bar{q}_{it}^{(n)}, \quad \forall t, \forall i$$
$$q_{it}^{(s)} = \sum_j x_{ijt}, \quad \forall t, \forall i$$
$$\sum_t x_{ijt} = \hat{x}_{ij}, \quad \forall j, \forall i$$
$$x_{ijt} = 0, \quad \forall j, \forall i, \forall t \notin [\alpha_{ij}, \beta_{ij}]$$
$$y_{it} \geq 0, \quad \forall t, \forall i$$
$$y_{it} \leq q_{it}^{(d)}, \quad \forall t, \forall i$$
$$x_{ijt} \geq \underline{x}_{ij}, \quad \forall t, \forall j, \forall i$$
$$x_{ijt} \leq \bar{x}_{ij}, \quad \forall t, \forall j, \forall i,$$

where $\tilde{q}_i^{(n)}$ the third line of equation 1) denotes the forecast the utility company has of the non-moveable demand for the next day. This problem could also be posed as a robust optimization problem, considering the error $\epsilon_{it}^{(n)}$ of the forecast for each user.

A more sophisticated problem is, given energy costs, billing structures, and incentive prices, to compute a solution that achieves a demand profile $\Psi = [\Psi_1 \ldots \Psi_T]$ with a minimum cost. This is the demand shaping problem. For a given error parameter $\Delta$, this problem can be written as follows (equation 2):

$$\min_{X,Y} \sum_t c_t(Q_t) + \sum_i \sum_t p^{(d)} y_{it} - \sum_i \sum_t B_t(q_{it}) + \Delta \|Q - \Psi\|_p \quad (2)$$

s.t.:

$$Q_t = \sum_i q_{it}, \quad \forall t,$$
$$q_{it} = (q_{it}^{(d)} - y_{it}) + q_{it}^{(s)} + \bar{q}_{it}^{(n)}, \quad \forall t, \forall i$$
$$q_{it}^{(s)} = \sum_j x_{ijt}, \quad \forall t, \forall i$$
$$\sum_t x_{ijt} = \hat{x}_{ij}, \quad \forall j, \forall i$$
$$x_{ijt} = 0, \quad \forall j, \forall i, \forall t \notin [\alpha_{ij}, \beta_{ij}]$$
$$y_{it} \geq 0, \quad \forall t, \forall i$$
$$y_{it} \leq q_{it}^{(d)}, \quad \forall t, \forall i$$
$$x_{ijt} \geq \underline{x}_{ij}, \quad \forall t, \forall j, \forall i$$
$$x_{ijt} \leq \bar{x}_{ij}, \quad \forall t, \forall j, \forall i$$

The present invention primarily focuses on the cost/revenue problem. The objective is to compute an optimal schedule for the shiftable demand and the sheddable demand, such that the revenues are maximized given cost, billing, and price incentive structures. The present invention assumes several requirements for this problem. One requirement is fairness. Specifically, the billing structure must be fair. If two customers consume the same amount at the same time, then the billing they should receive shouldn't differ even though their usage utility functions might differ. This means $B_i^f(q_{it}) = B^f(q_{it})$ and $B_{it}^S(q_{it}) = B_t^S(q_{it})$, $\forall i$. Similarly, if two users are requested to shed the same amount of demand at the same time period t, then the payment they receive should be the same, that is $p_{it}^{(d)} = p_t^{(d)}$, $\forall i$. Another requirement is proportionality. The present invention assumes the more energy a customer consumes, the larger the billing price should be, that is, $B^f(q_{it1}) \geq B^f(q_{it2})$ if $q_{it1} \geq q_{it2}$. Furthermore, the present invention assumes proportionality, that is, $B^f(q_{it1})/B^f(q_{it2}) = q_{it1}/q_{it2}$. This is certainly justified for small consumers/households, whereas it might not be true for larger industrial consumers that pay additional fees for peak consumption, load factors, and other factors. The same holds true for $B_t^S(q_{it})$.

Another requirement is positive revenues. The present invention assumes that the revenues for delivering the required demand Q are positive, that is, $\Sigma_t B^f(Q_t^1) + B_t^S(Q_t^2) \geq \Sigma_t C_t^d(Q_t^1) + C_t^S(Q_t^2)$. Another requirement relates to procurement. Let $\tilde{q}_i^{(n)} = [\tilde{q}_{i1}^{(n)} \ldots \tilde{q}_{iT}^{(n)}]$ denote an optimal procurement of the non-moveable demand of user i in the DAM. The present invention assumes that energy procurement is done in the following way. Since the utility company knows the shiftable demand and the sheddable demand a priori ($q_i^{(S)}$ and $q_i^{(d)}$) and an optimal procurement of the non-moveable demand $\tilde{q}_i^{(n)}$, it is assumed that it purchases a total demand $\tilde{Q} = [\tilde{Q}_1 \ldots \tilde{Q}_T]\tilde{Q}_t = \Sigma_i(q_{it}^{(d)} + q_{it}^{(s)} + \tilde{q}_{it}^{(n)})$ in the DAM, and it has a cost of $C_t^d(\tilde{Q}_t)$ to deliver it to the final users. The difference between the purchased energy $\tilde{Q}_t^{(n)}$ and the real non-moveable demand $Q_t^{(n)}$ is purchased in the RTM and it has a total delivery cost of $C_t^S((Q_t^{(n)} - \tilde{Q}_t^{(n)})^+)$. Note that this framework can also account for the spinning reserve (i.e., the generation capacity that is online but unloaded and that can respond quickly to compensate for generation or transmission outages). This is done by purchasing in the DAM not only $\tilde{Q}_t$, but $(1+\epsilon)\tilde{Q}_t$ where $\epsilon$ denotes the additional fraction purchased as spinning reserve. Then, the total cost of procuring the energy will be given by $C_t^d((1+\epsilon)\tilde{Q}_t) + C_t^S((Q_t^{(n)} - (1+\epsilon)\tilde{Q}_t^{(n)} - \epsilon Q_t^{(d)} - \epsilon Q_t^{(s)})^+)$.

Another requirement relates to the shedding function. Most of the current literature defines a simple shedding function $S_i(p_{it}^{(d)})$ since that simplifies the analysis significantly. For example, in the article by A.-H. Mohsenian-Rad, et al., the authors use $y_{it} = S_i(p_{it}^{(d)}) = a_i(p_{it}^{(d)})$, where $a_i$ is a user-dependent parameter, and then proceed to compute an $a_i$ that maximizes the user's revenues. There are two main issues with this approach. First, the user is changing its preference every time a price is given and, second, it is already known that the user has a discomfort cost $D_i(y_{it})$ which can be used to find the optimal load $y_{it}$ that will maximize the user's revenues. Hence, instead of using a simplification for the shedding function, the present invention solves the user's optimization problem to find the optimal load to shed.

With these requirements assumed, the present invention addresses the cost/revenue problem in the following way. For simplicity, let $B_t(q_{it}^1, q_{it}^2) = B^f(q_{it}^1) + B_t^S(q_{it}^2)$ and $C_t(Q_t^1, Q_t^2) = C_t^d(Q_t^1) + C_t^S(Q_t^2)$. Similarly, let $X = [x'_{11} \ldots x'_{nm}]'$ and $Y = [y'_1 \ldots y'_n]'$. With this, the optimization problem for the utility company becomes as follows (equation 3):

$$\max_{X,Y,\tilde{Q}_t^{(n)}} \sum_t \sum_i [B_t(q_{it}^{(s)} + q_{it}^{(d)} - y_{it}, q_{it}^{(n)}) - p_t^{(d)} y_{it}] - \quad (3)$$

$$C_t(Q_t^{(d)} - Y_t + Q_t^{(s)} + \tilde{Q}_t^{(n)}, Q_t^{(n)} - \tilde{Q}_t^{(n)})$$

s.t.:

$$q_{it}^{(s)} = \sum_j x_{ijt}, \quad \forall t, \forall i$$

$$\sum_t x_{ijt} = \hat{x}_{ij}, \quad \forall j, \forall i$$

$$x_{ijt} = 0, \quad \forall j, \forall i, \forall t \notin [\alpha_{ij}, \beta_{ij}]$$

$$y_{it} \geq 0, \quad \forall t, \forall i$$

$$y_{it} \leq q_{it}^{(d)}, \quad \forall t, \forall i$$

$$x_{ijt} \geq \underline{x}_{ij}, \quad \forall t, \forall j, \forall i$$

$$x_{ijt} \leq \overline{x}_{ij}, \quad \forall t, \forall j, \forall i$$

This optimization problem assumes that the actual procurement cost in the RTM $C_t^S(Q_t)$ and the actual non-moveable demand $Q_t^{(n)}$ are known a priori. Since that is seldom the case, a robust optimization approach is used to compute an optimal solution. The idea behind a robust optimization formulation is to consider not a single expected value of a stochastic variable, but a whole set of possible values from which the approach needs to cover the solution. The amount of robustness in the solution is then controlled by the size of the uncertainty set in which the stochastic variables are considered to be included.

Given that there are two main stochastic variables in the above optimization problem (equation 3), then the optimization problem can have robustness in two different ways. First, there can be robustness in procurement costs. The RTM prices can be considered as a stochastic process, hence, the problem becomes how much energy to purchase in the DAM given that there is uncertainty in the prices in the RTM. In this case, the uncertainty set (symbolized as calligraphic C)

$$\mathcal{C}_t, \text{ for } t = \{1, \ldots, T\}$$

will represent the possible cost functions the utility company will get in the RTM at time step t during the next day. Second, there can be robustness in consumption level. The second robust optimization formulation is achieved by considering the stochastic process behind the non-moveable demand. In this case $$Q_t^{(n)}, \text{ for } t = \{1, \ldots, T\}$$

denotes the uncertainty set (symbolized as calligraphic Q) for the non-moveable demand $Q_t^{(n)}$. The constraint that demand is within a certain convex set is added and an optimal solution for all demands within that set is computed.

Both settings can be combined and optimal solutions can be computed when the procurement cost and the consumption are unknown. This might lead to very conservative solutions since the formulation accounts for two sources of uncertainty. The full robust problem formulation is then given by (equation 4):

$$\max_{X,Y,\tilde{Q}_t^{(n)}} \min_{C_t,Q_t^{(n)}} \sum_t \sum_i [B_t(q_{it}^{(s)} + q_{it}^{(d)} - y_{it}, q_{it}^{(n)}) - p_t^{(d)} y_{it}] - \quad (4)$$

$$C_t(Q_t^{(d)} - Y_t + Q_t^{(s)} + \tilde{Q}_t^{(n)}, Q_t^{(n)} - \tilde{Q}_t^{(n)})$$

s.t.:

$$q_{it}^{(s)} = \sum_j x_{ijt}, \quad \forall t, \forall i$$

$$\sum_t x_{ijt} = \hat{x}_{ij}, \quad \forall j, \forall i$$

$$x_{ijt} = 0, \quad \forall j, \forall i, \forall t \notin [\alpha_{ij}, \beta_{ij}]$$

$$C_t \in \mathcal{C}_t, \quad \forall t,$$

$$Q_t^{(n)} \in \mathcal{Q}_t^{(n)}, \quad \forall t,$$

$$y_{it} \geq 0, \quad \forall t, \forall i$$

$$y_{it} \leq q_{it}^{(d)}, \quad \forall t, \forall i$$

$$x_{ijt} \geq \underline{x}_{ij}, \quad \forall t, \forall j, \forall i$$

$$x_{ijt} \leq \overline{x}_{ij}, \quad \forall t, \forall j, \forall i$$

The level of robustness in the above problem (equation 4), and thus how conservative is the solution, will depend on the uncertainty sets $$\mathcal{C}_t \text{ and } \mathcal{Q}_t^{(n)}.$$

In general, these uncertainty sets can be either boxes, which basically add a set of box constraints to the optimization model, or ellipsoids. The main advantage of box constraints is its ease of implementation since most of the time that is translated to interval constraints for each variable. The drawback is that the corners of the box make the solution overly conservative since they are much further away from the centre of the box compared to the sides. On the other hand, ellipsoid sets give better solutions and don't suffer from being overly-conservative. The disadvantage is that they are harder to implement since they are not linear and can only be approximated if a linear model is desired.

Considering the cost/revenue problem detailed above, there is also a need to design a mechanism that would determine the billing structure $B_t(q_{it}^1, q_{it}^2)$ and the price incentive structure $p_t^{(d)}$), such that the whole system achieves equilibria. That is, given the structure computed by this mechanism, the optimal solution obtained by the utility company will give no incentives to the final customers to change their solutions or cheat.

As a separate issue, to understand what will be the objective of the final customer, the optimization problem they see must be posed. At time-step t, user i is billed an amount $B_t(q_{it}^{(s)} + q_{it}^{(d)} + q_{it}^{(n)})$ by the utility company, and is paid $p_{it}^{(d)}$ per unit of load shed, hence the user will solve the following optimization problem (equation 5), $$\min_{x_i, y_i} \sum_{t=1}^T B_t(q_{it}^{(s)} + q_{it}^{(d)} - y_{it}, q_{it}^{(n)}) + D_{it}(y_{it}) - p_{it}^{(d)} y_{it} \quad (5)$$

s.t.:

$$q_{it}^{(s)} = \sum_j x_{ijt}, \quad \forall t,$$

$$\sum_t x_{ijt} = \hat{x}_{ij}, \quad \forall j,$$

$$x_{ijt} = 0, \quad \forall j, \forall t \notin [\alpha_{ij}, \beta_{ij}]$$

$$y_{it} \geq 0, \quad \forall t,$$

$$y_{it} \leq q_{it}^{(d)}, \quad \forall t,$$

$$x_{ijt} \geq \underline{x}_{ij}, \quad \forall t, \forall j,$$

$$x_{ijt} \leq \overline{x}_{ij}, \quad \forall t, \forall j,$$

In summary, the cost/revenue problem has two basic parts that need to be addressed. One part is that prices and billing structures that achieve some equilibrium must be computed, and, in a second part, the allocation of demand for each user given these prices and billing structure must be computed. The control method 100 solves this problem by performing a two-step process which iterates between computing a billing structure and computing the price incentive to achieve an equilibrium.

To analyze how to solve the general version of this problem posed in equation 4, additional structure is pointed out. First, it is assumed that the general billing structure is linear, that is, $B^f(q_{it}) = b^f q_{it}$ and $B_t^S(q_{it}) = b_t^S q_{it}$, for all t, where $b^f$ and $b_t^S$ and are constants. Although this is not the case for large industrial consumers, most residential households do have a linear billing cost. As noted above, since the utility company has direct control over the shiftable demand and the sheddable demand, it is assumed that the billing structure for these demands is constant throughout the day, i.e., $b_t^f = b^f$, for all t.

The method 100 comprises a first step 102 that addresses price incentive and shedding calculation. The objective of this first step 102 is to compute the optimal amount of demand to shed and the price incentive required to do so. It is assumed that the billing structure $B_t(Q_t^1, Q_t^2)$ is known for all t, as well as the solution X for the shiftable loads. With these assumptions, and given $p^{(d)}$, the utility company's problem (given by equation 4) simplifies to the following (equation 6):

$$\max_{Y,\tilde{Q}_t^{(n)}} \min_{C_t,Q_t^{(n)}} \sum_t \sum_i [b^f(q_{it}^{(d)} - y_{it}) + b_t^s q_{it}^{(n)} - p_t^{(d)} y_{it}] - \quad (6)$$

$$C_t(Q_t^{(d)} - Y_t + Q_t^{(s)} + \tilde{Q}_t^{(n)}, Q_t^{(n)} - \tilde{Q}_t^{(n)})$$

s.t.:

$$q_{it}^{(s)} = \sum_j x_{ijt}, \quad \forall t, \forall i$$

$$C_t \in \mathcal{C}_t, \quad \forall t,$$

$$Q_t^{(n)} \in \mathcal{Q}_t^{(n)}, \quad \forall t,$$

$$y_{it} \geq 0, \quad \forall t, \forall i$$

$$y_{it} \leq q_{it}^{(d)}, \quad \forall t, \forall i,$$

which is separable in t; hence, for every time step t the following optimization problem needs to be solved (step 104) (equation 7):

$$\max_{Y_t, \tilde{Q}_t^{(n)}} \min_{C_t, Q_t^{(n)}} \sum_i [b^f(q_{it}^{(d)} - y_{it}) + b_t^s q_{it}^{(n)} - p_t^{(d)} y_{it}] - \qquad (7)$$

$$C_t^d(Q_t^{(d)} - Y_t + Q_t^{(s)} + \tilde{Q}_t^{(n)}) - C_t^s(Q_t^{(n)} - \tilde{Q}_t^{(n)})$$

s.t.:

$$q_{it}^{(s)} = \sum_j x_{ijt}, \quad \forall i$$

$$C_t \in C_t,$$

$$Q_t^{(n)} \in Q_t^{(n)},$$

$$y_{it} \geq 0, \quad \forall i$$

$$y_{it} \leq q_{it}^{(d)}, \quad \forall i$$

In the setting that the price incentive is set externally (e.g., by government regulations, contracts, etc.), and the utility company can shed the load directly, this optimization problem can be solved using standard convex optimization techniques (step 104*a*), and the method 100 can move to a second step 110 for billing and shift calculation.

In the setting that the utility company has to set the price so that the final users are motivated to shed their load, the utility company has no direct control over the load, and can only set the price offer so that respective pre-programmed smart meters at a user take the decision of what amount of load to shed depending on the user's preferences and loss function (step 104*b*). From the user's point of view, given a billing structure, a solution for the shiftable load, and a price incentive $p_t^{(d)}$, the optimization problem for every time step t is given by (equation 8):

$$\min_{y_i} b^f(-y_{it}) + D_{it}(y_{it}) - p_t^{(d)} y_{it}, \qquad (8)$$

s.t.:

$$y_{it} \leq q_{it}^{(d)},$$

$$y_{it} \geq 0.$$

which is easily solvable once $D_{it}$ is known. If it is assumed $D_{it}$ is continuous, increasing, and differentiable, then the solution for this user optimization problem (equation 8) is given by (equation 9):

$$y^*_{it} = S_{it}(p_t^{(d)}) = \min\{q_{it}^{(d)}, \max\{0, D'_{it}^{-1}(p_t^{(d)} + b^f)\}\} \qquad (9)$$

This computes the optimal value of $y_{it}$ for each user i at each time step t, and thus can be considered as the shedding function for user i at time t. Let $S_t(p_t^{(d)}) = \Sigma_i S_{it}(p_t^{(d)})$, then the utility company's problem for each time step t is given by (step 104*b*) (equation 10):

$$\max_{p_t^{(d)}, \tilde{Q}_t^{(n)}} \min_{C_t, Q_t^{(n)}} \sum_i [b^f q_{it}^{(d)} + b_t^s q_{it}^{(n)}] - \qquad (10)$$

$$(p_t^{(d)} + b^f) Y_t - C_t(Q_t^{(d)} - Y_t + Q_t^{(s)} + \tilde{Q}_t^{(n)}, Q_t^{(n)} - \tilde{Q}_t^{(n)})$$

s.t.:

$$q_{it}^{(s)} = \sum_j x_{ijt}, \quad \forall i$$

$$Y_t = S_t(p_t^{(d)}),$$

$$C_t \in C_t,$$

$$Q_t^{(n)} \in Q_t^{(n)},$$

$$y_{it} \geq 0, \quad \forall i$$

$$y_{it} \leq q_{it}^{(d)}, \quad \forall i.$$

If $S_t(p_t^{(d)})$ is known then again this can be directly solved, although there is no assurance that the problem is convex any more since $S_t(p_t^{(d)})$ might not be convex. Knowing $S_t(p_t^{(d)})$ is a limiting assumption since it implies that either all the user loss functions $D_{it}(y_{it})$ are known (which has important privacy concerns) or that $S_t(p_t^{(d)})$ can be recovered by sending the price information to the users' smart meters (which might be a data intensive operation but doesn't have to be done often).

The second step 110 for billing and shift calculation uses the results from the previous step 102, i.e., $p^{(d)}$ and $y_i$, $\forall i$ and computes the billing structure $B_t$, and the demand schedule for the shiftable load $x_{ij}$, $\forall i, j$. Since $p^{(d)}$ and $y_i$, $\forall i$, are known, the utility company's problem is simplified to the following (step 112):

$$\max_{X, Y, \tilde{Q}_t^{(n)}} \min_{C_t, Q_t^{(n)}} \sum_t \sum_i B_t(q_{it}^{(s)} + q_{it}^{(d)} - y_{it}, q_{it}^{(n)}) - \qquad (11)$$

$$C_t(Q_t^{(d)} - Y_t + Q_t^{(s)} + \tilde{Q}_t^{(n)}, Q_t^{(n)} - \tilde{Q}_t^{(n)})$$

s.t.:

$$q_{it}^{(s)} = \sum_j x_{ijt}, \quad \forall t, \forall i$$

$$\sum_t x_{ijt} = \hat{x}_{ij}, \quad \forall j, \forall i$$

$$x_{ijt} = 0, \quad \forall j, \forall i, \forall t \notin [\alpha_{ij}, \beta_{ij}]$$

$$C_t \in C_t, \quad \forall t,$$

$$Q_t^{(n)} \in Q_t^{(n)}, \quad \forall t,$$

$$x_{ijt} \geq \underline{x}_{ij}, \quad \forall t, \forall j, \forall i$$

$$x_{ijt} \leq \overline{x}_{ij}, \quad \forall t, \forall j, \forall i$$

There are two main approaches to solve the problems as the one posed in equation 11. One is to assume a utility function for each user that will relate the energy consumption with the price of consuming that energy, and thus control the billing. The problem with this approach in practice is that it is very hard to recover or even estimate these utility functions. The other relies on the fact that since the electric market is highly regulated, in many cases the billing costs to final users are regulated as well and to be kept within certain values. The method 100 utilizes the second approach and assumes that the utility ratio Y (symbolized as the Greek letter upsilon with hooks and as seen in Equations 12, 14 and 15 below) is fixed. The latter is similar to the article by A.-H. Mohsenian-Rad, et al., but unlike this previous work, the method 100 keeps the ratio separately for the shiftable plus sheddable load and the non-moveable load. Hence, the formulation is as follows:

$$\Upsilon \equiv \frac{\sum_t \sum_i B^f(q_{it}^{(s)} + q_{it}^{(d)} - y_{it})}{\Psi \sum_t C_t^d(Q_t^{(d)} - Y_t + Q_t^{(s)} + \tilde{Q}_t^{(n)})} = \qquad (12)$$

$$\frac{\sum_i B_t^s(q_{it}^{(n)})}{\Phi_i C_t^d(Q_t^{(d)} - Y_t + Q_t^{(s)} + \tilde{Q}_t^{(n)}) + C_t^s(Q_t^{(n)} - \tilde{Q}_t^{(n)})} \geq 1,$$

where the second equality is for all t and $$\Psi = \frac{\sum_t Q_t^{(d)} - Y_t + Q_t^{(s)}}{\sum_t Q_t^{(d)} - Y_t + Q_t^{(s)} + Q_t^{(n)}}; \quad (13)$$

$$\Phi_i = \frac{\tilde{Q}_i^{(n)}}{\sum_i Q_t^{(d)} - Y_t + Q_t^{(s)} + \tilde{Q}_t^{(n)}}, \forall t.$$

Using equations 12 and 13, respective billing structures may be formulated as follows (step 114a):

$$b^f = \frac{\Upsilon \sum_t C_t^d (Q_t^{(d)} - Y_t + Q_t^{(s)} + \tilde{Q}_t^{(n)})}{\sum_t Q_t^{(d)} - Y_t + Q_t^{(s)} + \tilde{Q}_t^{(n)}}, \quad (14)$$

and $$b_t^s = \left(\frac{\Upsilon \tilde{Q}_t^{(n)}}{Q_t^{(n)}}\right) \frac{C_t^d (Q_t^{(d)} - Y_t + Q_t^{(s)} + \tilde{Q}_t^{(n)})}{\sum_t Q_t^{(d)} - Y_t + Q_t^{(s)} + Q_t^{(n)}} + \left(\frac{\Upsilon}{Q_t^{(n)}}\right) C_t^s (Q_t^{(n)} - \tilde{Q}_t^{(n)}), \forall t. \quad (15)$$

Note that the value of $b^f$ can be computed without knowing the optimal solution for X, since only $\Sigma_t \Sigma_i \Sigma_j x_{ijt}$ is needed, which is known and constant. On the other hand, $b_t^S$ cannot be computed until the realization of the non-moveable demand; but, since X is not affected by $b_t^S$ one can compute the optimal shiftable demand by solving the following (step 114b):

$$\max_{X, Q_t^{(n)}} \min_{C_t, Q_t^{(n)}} \sum_t \sum_i b^f q_{it}^{(s)} - \quad (16)$$

$$\sum_t C_t^d (Q_t^{(d)} - Y_i + Q_t^{(s)} + \tilde{Q}_t^{(n)}) - \sum_t C_t^s (Q_t^{(n)} - Q_t^{(n)})$$

s.t.:

$$q_{it}^{(s)} = \sum_j x_{ijt}, \qquad \forall t, \forall i$$

$$\sum_t x_{ijt} = \hat{x}_{ij}, \qquad \forall j, \forall i$$

$$x_{ijt} = 0, \qquad \forall j, \forall i, \forall t \notin [\alpha_{ij}, \beta_{ij}]$$

$$C_t \in \mathcal{C}_t, \qquad \forall t,$$

$$Q_t^{(n)} \in \mathcal{Q}_t^{(n)}, \qquad \forall t,$$

$$x_{ijt} \geq \underline{x}_{ij}, \qquad \forall t, \forall j, \forall i$$

$$x_{ijt} \leq \overline{x}_{ij}, \qquad \forall t, \forall j, \forall i$$

With this problem solved, the method 100 returns to the price incentive and shedding step 102 and repeats all of the method 100 steps until convergence is achieved (step 130). Importantly, the method 100 solves this problem in a centralized manner (unlike the distributed manner presented by the article by A.-H. Mohsenian-Rad, et al.).

From a procurement standpoint, the method 100 considers a two level market from which the utility company purchased the energy required to cover the demand. Second, unlike previous work, the method 100 takes into account that demand level and the procurement prices are indeed unknown stochastic processes. The method 100 accommodates these factors through robust optimization. Finally, the method 100 simultaneously uses demand shedding and demand shifting as a means to shape the demand according to the required objectives. Although three different problems were identified that can be tackled in the framework of the present invention, the method 100 focuses on the revenue optimization problem which is the most important one for utility companies.

In simulations using randomly-generated data, the results of using the control method 100 have been compared against the results of using no control method. The test procedure is described below.

Figure 3A:
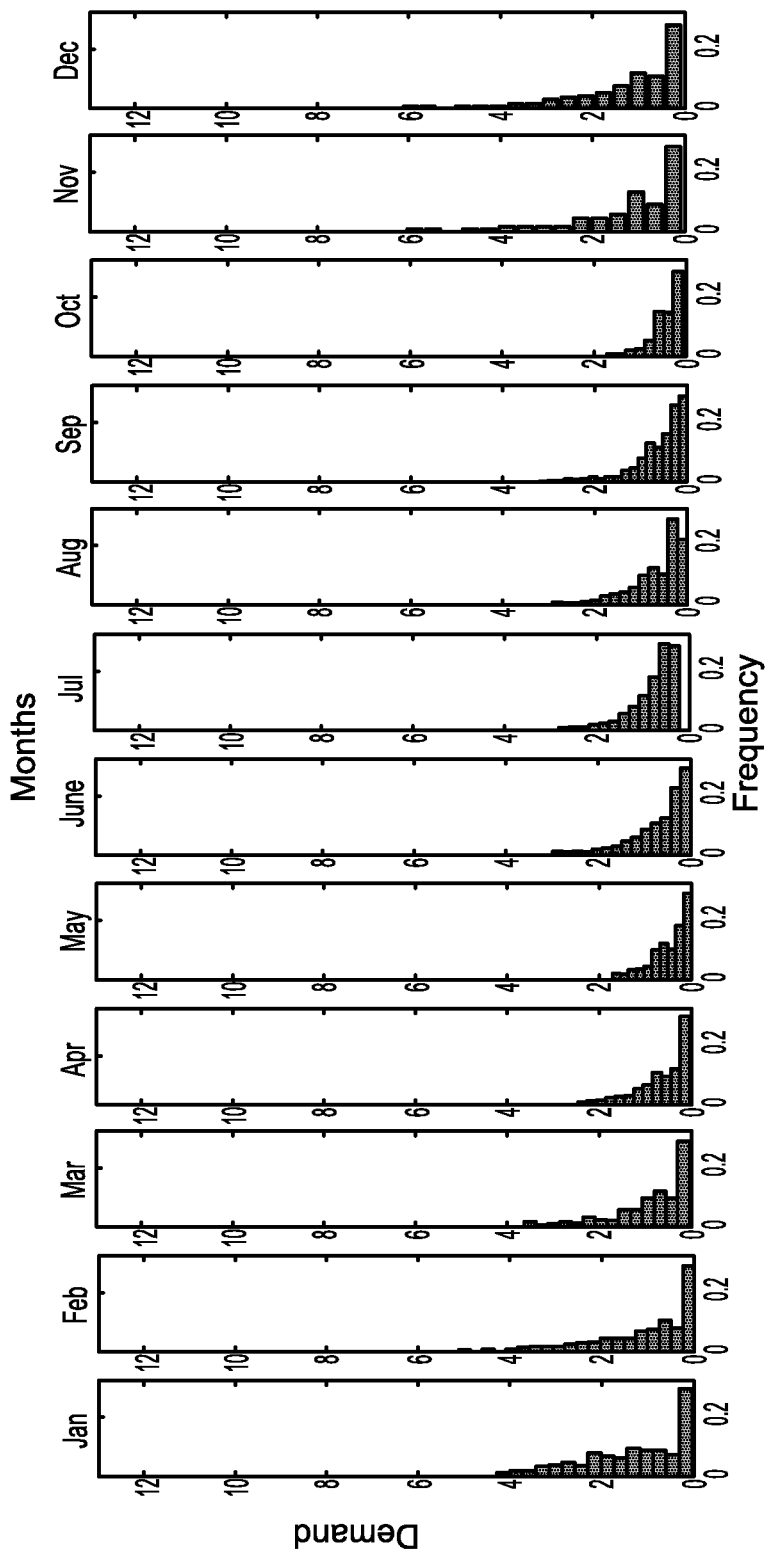
FIG. 3a shows histograms of synthetic data of monthly demand distribution for a user.
Figure 3B:
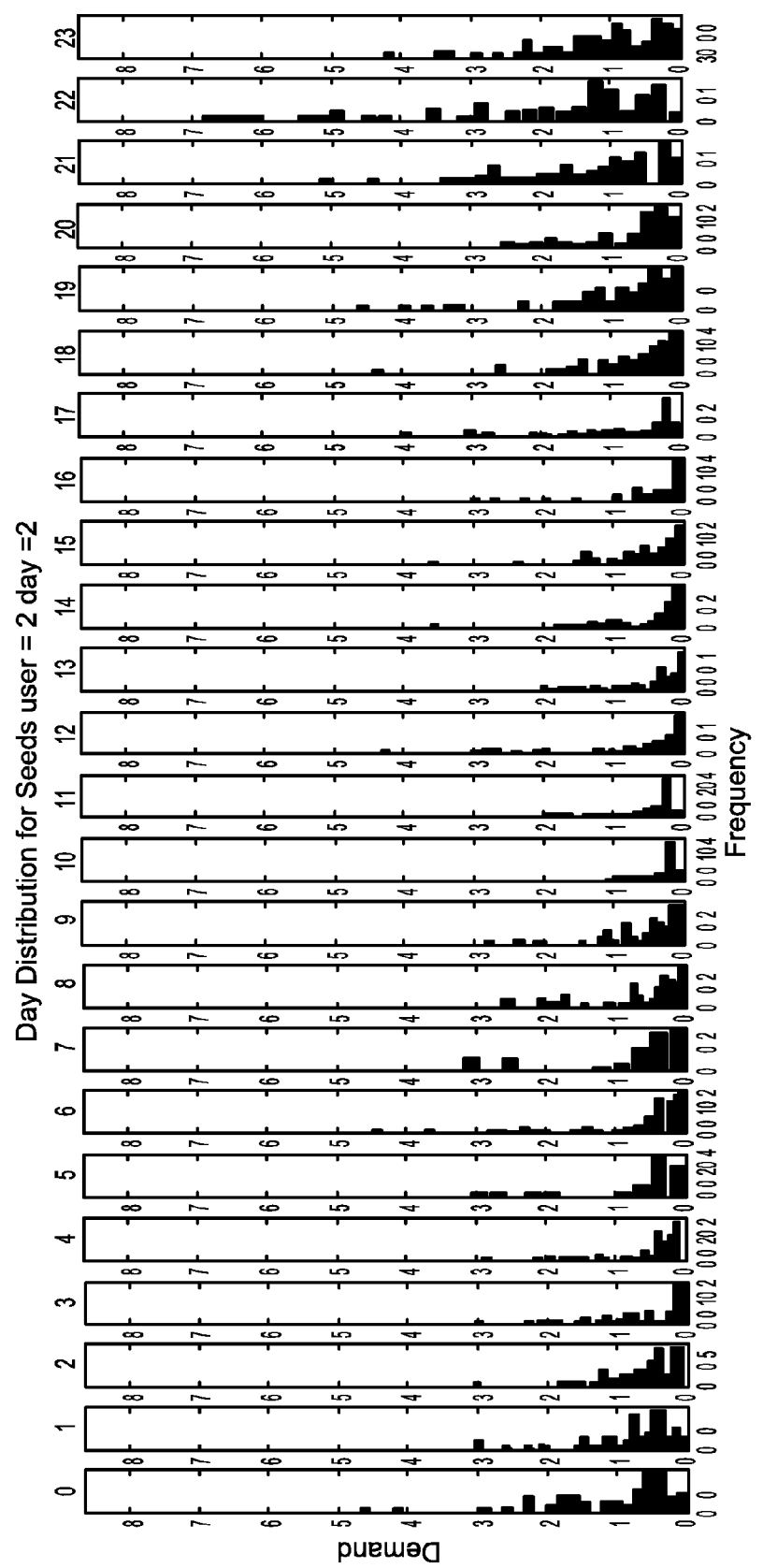
FIG. 3b shows histograms of synthetic data of hourly demand distribution for a user.

In the simulations, synthetic data was randomly generated for each user/customer. To get useful and more realistic demand patterns, household consumption data was used as a seed to generate the synthetic data for the users/customers. Eighteen (18) months of hourly data for six (6) different users was used to compute seeds that would later generate random instances. In order to define the types of seeds, the data was statistically analyzed in several different ways. FIGS. 3a and 3b show two different examples. In FIG. 3a, the hourly consumption data was grouped for a single user for every month and its distribution was computed, and are presented as vertical histograms, one for each month. Similarly, FIG. 3b shows the result of grouping the data of a single user for a single day of the week (Tuesday in this case) for each hour of the day, and are presented as vertical histograms. It is noted there is a notable change in the consumption pattern depending on the hour of the day, which also varies depending on the day of the week.

By grouping demand by day of the week and hour, a good balance was obtained between recovering the details of the demand distribution and having enough data points to have a meaningful empirical distribution since adding month, for example, would leave only 4 or 5 data points for each group which cannot give enough information.

Figure 3C:
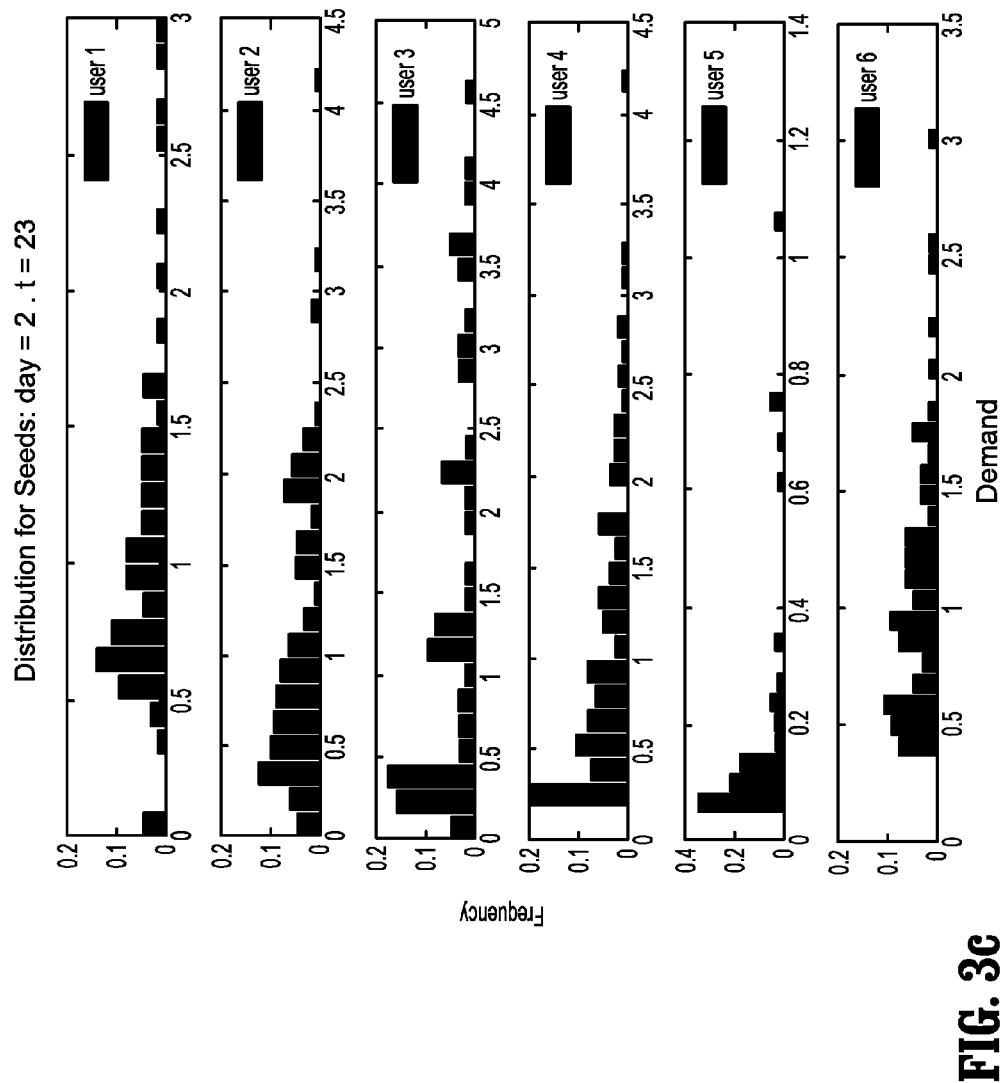
FIG. 3c shows histograms of synthetic data of single day of the week and single hour demand distributions for multiple users.

As FIG. 3c shows, it is also noted that there are differences among the different users in the raw data, although it is difficult to be certain given the low amount of samples. Still, it was assumed that each user represents the average or typical distribution of a certain cluster of users, and this was used as a seed to generate a population of users that has a mix between the different clusters.

Using this information as a seed, the hourly demand pattern for any single day of the week can be generated for a population that contains a mix of the six (6) different users identified in the raw data. This can be done by generating uniformly distributed random variables in the following manner. Let $f_{u,d,t}(z)$ denote the empirical probability mass function of the demand z of users in cluster $$u \in \{1, \ldots, 6\},$$

on day of the week $d = \{1, \ldots, 7\}$, and time $$t \in \{0, \ldots, 23\},$$

that were computed from the raw data, and let $F_{u,d,t}(z)$ denote its cumulative distribution function. Then, given a day of the week D for each user/customer of cluster U, twenty-four (24) uniformly distributed random variables $z_0, \ldots, z_{23}$ are generated and the demand of that user i at time t is set equal to $q_{it} = F_{U,D,t}^{-1}(z_t)$, making $q_{it}$ a random variable with probability mass function $f_{u,d,t}(z)$.

Although this method is simple to implement and allows the generation of over a million users very quickly, it has the drawback that the demand of the users will be independent, which is not the case in real life since there is a positive correlation of the energy demand among users. The process to generate correlated random variables is more complicated and requires the definition of a variance-covariance matrix for the users, limiting the number of final users that can be simulated due to the physical memory requirements in the test procedure. The current implementation can generate up to 5,000 users/customers, being limited mainly by the simulation computer's RAM. In this case, when generating an instance, a symmetric, positive definite matrix is randomly created that has only positive correlation factors among variables, S for each cluster within the population that is being simulated.

Figure 3D:
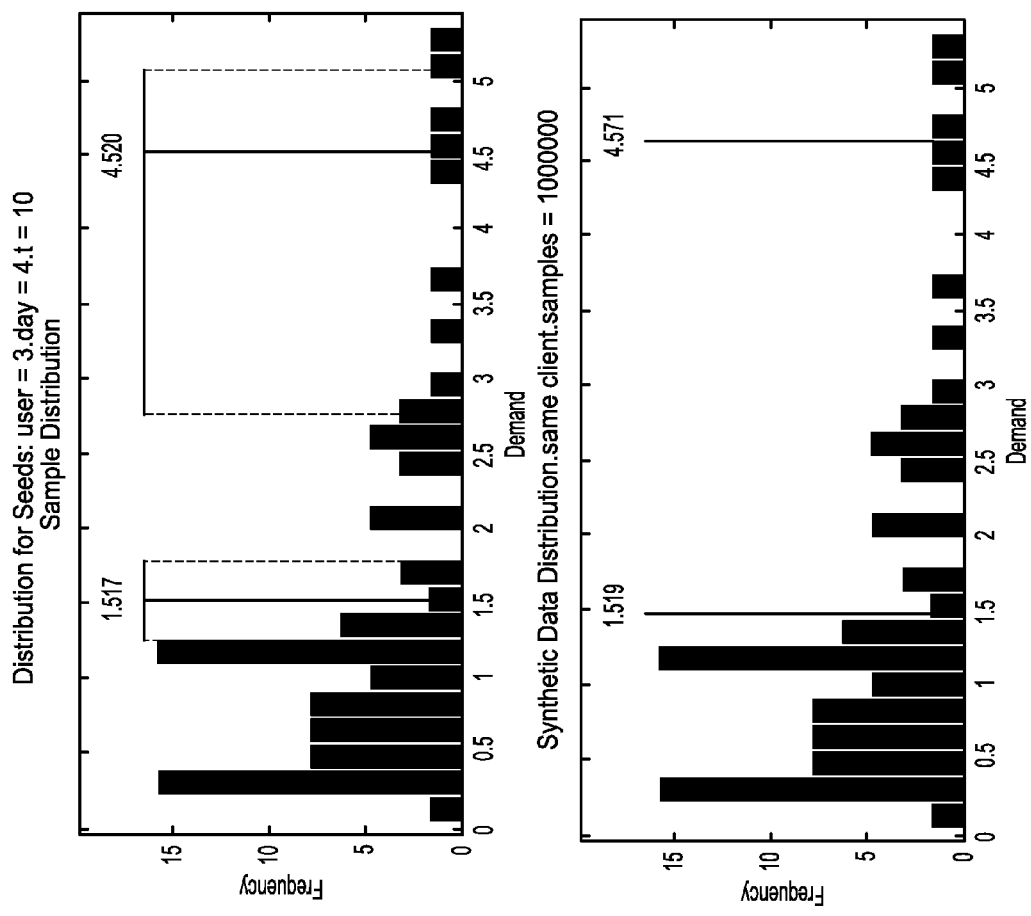
FIG. 3d shows synthetic data demand distribution comparison (same day of the week and hour) with empirical data for a user.

It is important to note that the final generated random variables (that is, $q_{it}$) will not necessarily have S as its variance-covariance matrix since $F_{u,d,t}(z)$ could not preserve the correlation, but it serves as a simple and good enough proxy to positively correlate the simulated demand patterns for the users of a cluster. Also, it is noted that due to the correlation, the distribution of the demand of all users of a cluster u in a certain day of the week d and hour t will not follow the corresponding distribution $f_{u,d,t}$. But, as shown in FIG. 3d, if several samples of the same user for the same day of the week and hour are taken, the final distribution for that user (bottom chart) will be identical to the empirical one (top chart), just as expected.

Figure 3E:
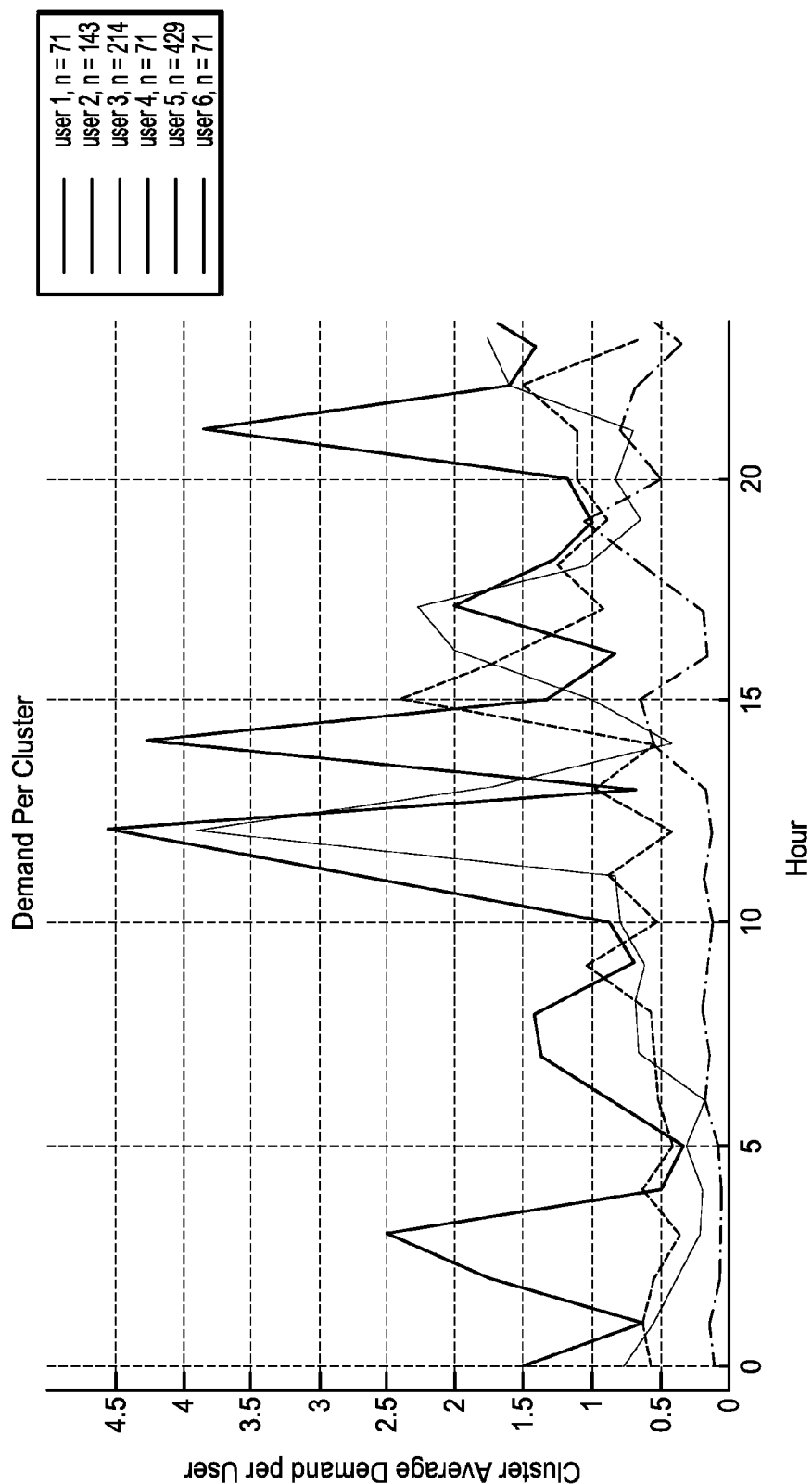
FIG. 3e is a chart of simulated average user demand for each user cluster for one day.

FIG. 3e shows the simulated average user demand for each cluster and for a whole day. Finally, for each user, there needs to be a simulation of what part of that demand is shiftable, sheddable, or non-moveable at every time in the day simulation. Since those patterns might differ from one user to another, only the relative weights of each type of demand were set for each cluster of users and the proportion for each final user, using the relative weights as a seed, were generated.

Figure 3F:
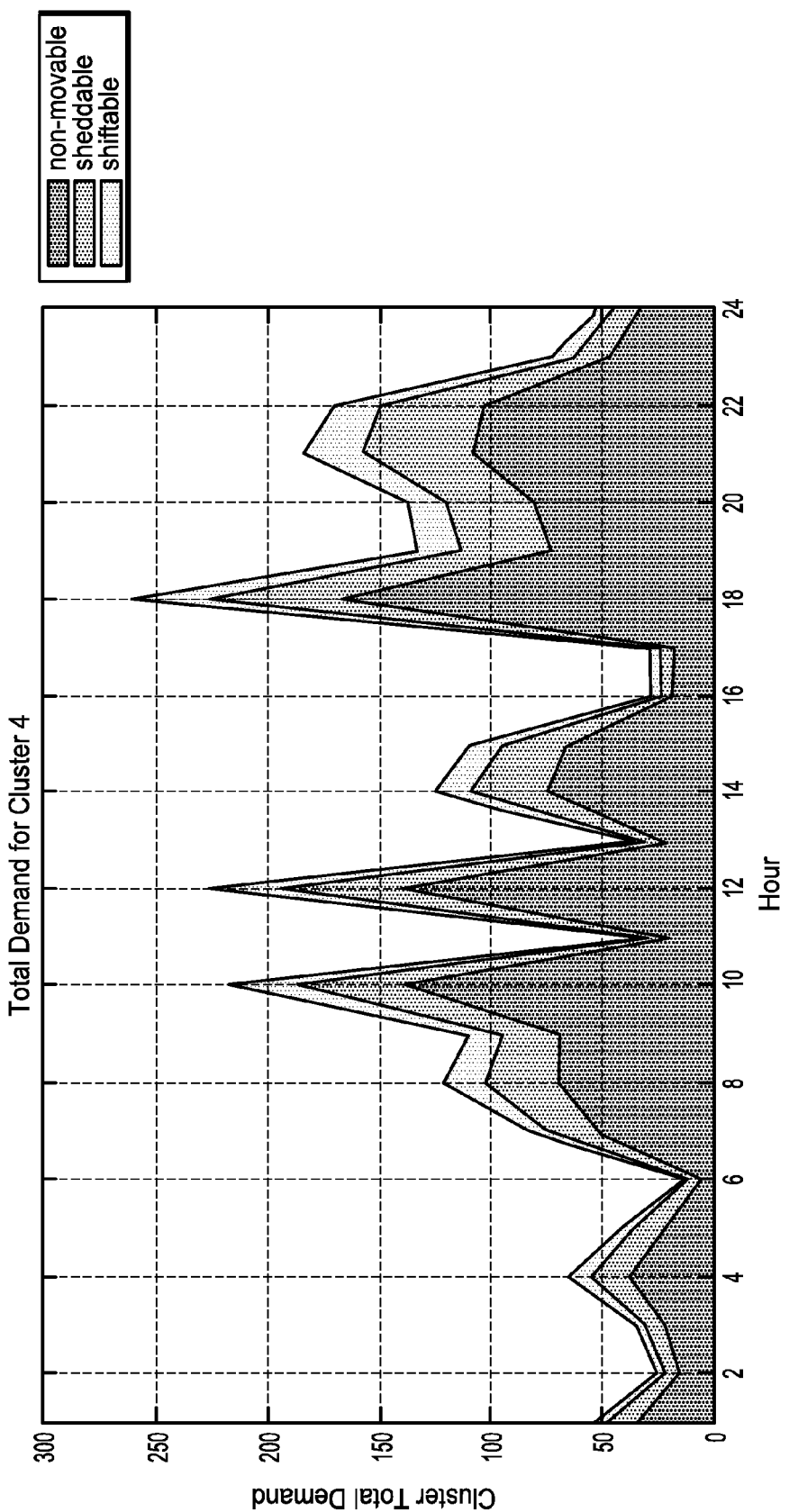
FIG. 3f is a chart of the shiftable, sheddable, and non-moveable demand for a user cluster.
Figure 3G:
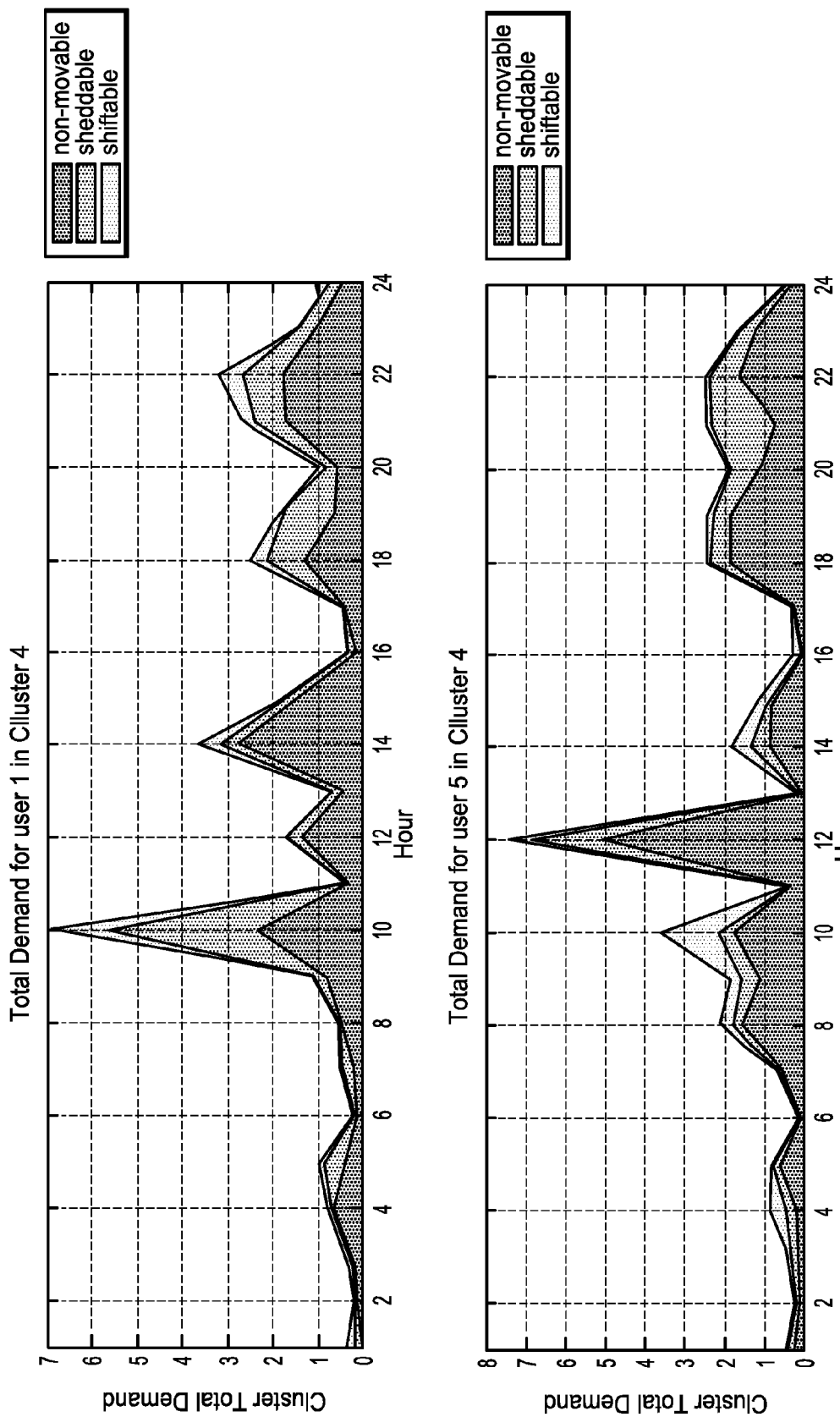
FIG. 3g shows a demand pattern comparison (shiftable, sheddable, and non-moveable demand in the same day) between two users in the same user cluster.

FIG. 3f shows the total aggregated demand for cluster 4 indicating which part is considered shiftable, sheddable, or non-moveable. To show that each user within this cluster actually has its own randomly generated demand, FIG. 3g shows the daily demand pattern of two different users within the users of cluster 4 showing that although they are different they do have some correlation; whereas, the proportions of shiftable, sheddable, and non-moveable demands are completely random among users.

Figure 3H:
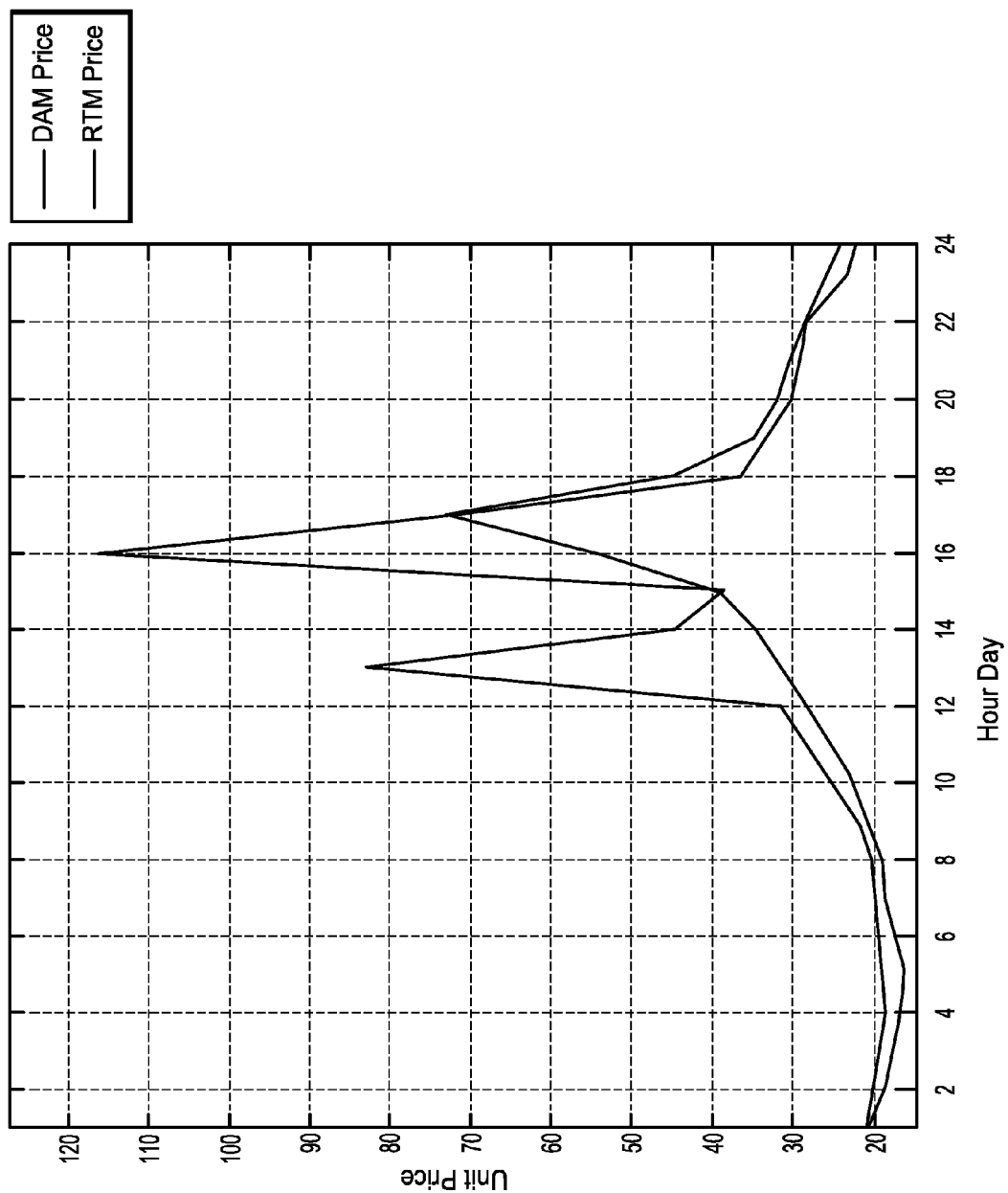
FIG. 3h is a chart of exemplary DAM and RTM energy procurement costs for a single day.

In the simulations, another important variable to test the method 100 is the energy procurement cost. The simulations used data from the Electric Reliability Council of Texas website (http://www.ercot.com), specifically the Houston prices, to simulate the DAM and RTM prices. Two months of price data were used and the average for the corresponding day of the week in which the simulation is done was used. The DAM prices are given hourly, but given that the RTM prices are provided with 15 minutes resolution, the maximum price for that hour was used as the hourly data to capture the worst case scenarios. FIG. 3h shows an example of the DAM and RTM prices for a Friday.

Figure 3I:
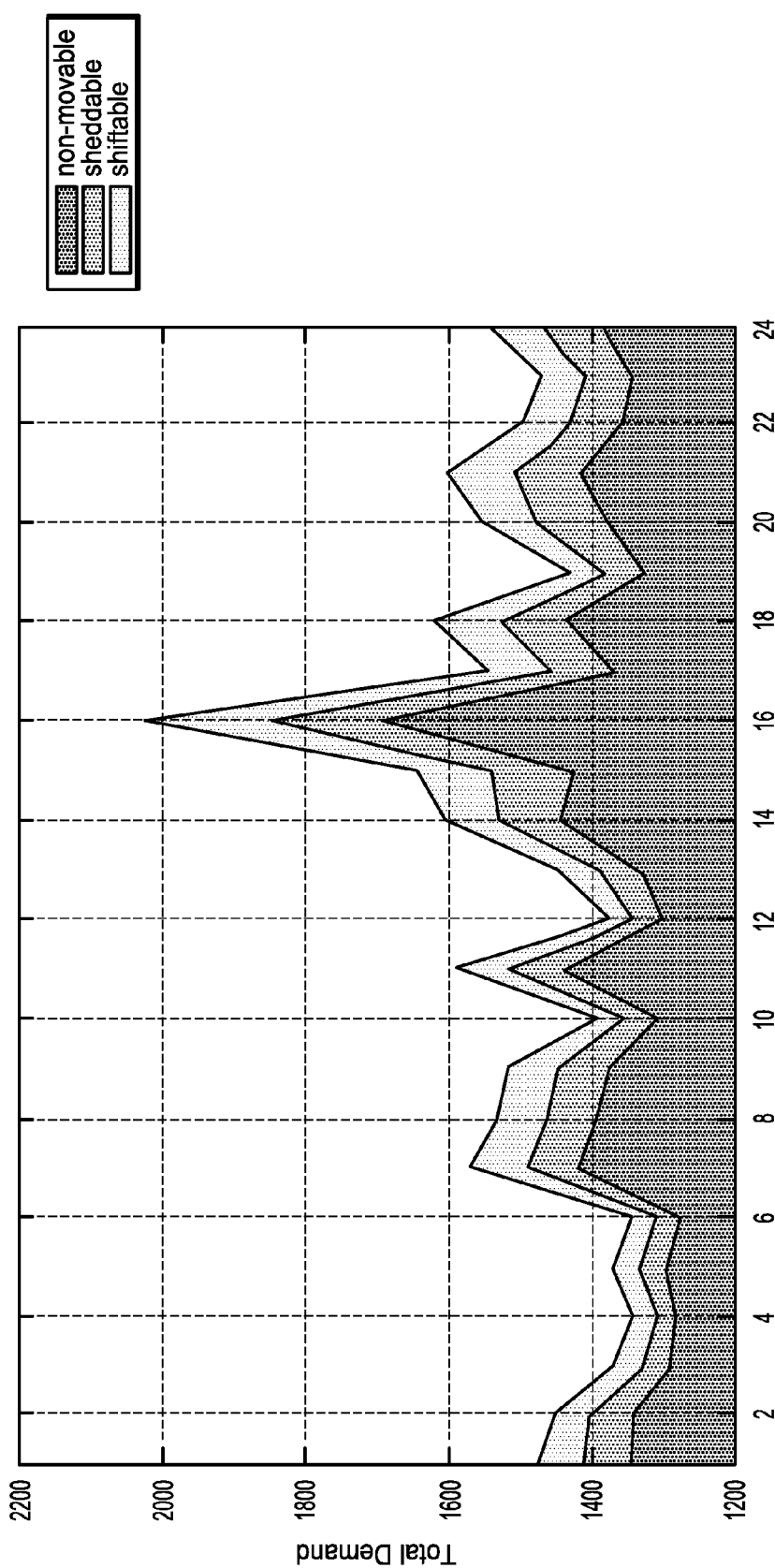
FIG. 3i is a chart of the synthetic demand pattern (shiftable, sheddable, and non-moveable demand) used by a base case in a simulation comparison with the method of FIG. 2.

In the simulations, the method 100 output is compared with a base case in order to analyze how good is the solution given by the method 100. As a base case, the simulations consider the setting in which the utility company has no control over the demand of its users and will just purchase energy in the DAM using a forecast of the total energy consumption for the next day and then buy in the RTM whatever extra energy it requires over what was forecasted. Since the performance will depend on how good the forecast is, for a first set of simulations, it was assumed the non-moveable demand and the RTM prices were known at the moment the problem was solved. In other words, the robustness part was eliminated by setting the RTM prices uncertainty set and the $Q_t^{(n)}$ uncertainty sets equal to the actual values of those quantities. For this case, FIG. 3i shows the total value of one of the randomly generated demands. Although in the base case the utility company cannot control the final user's demand, the different types of demand (shiftable, sheddable, and non-moveable) are highlighted to compare it with the method 100 output.

Figure 3J:
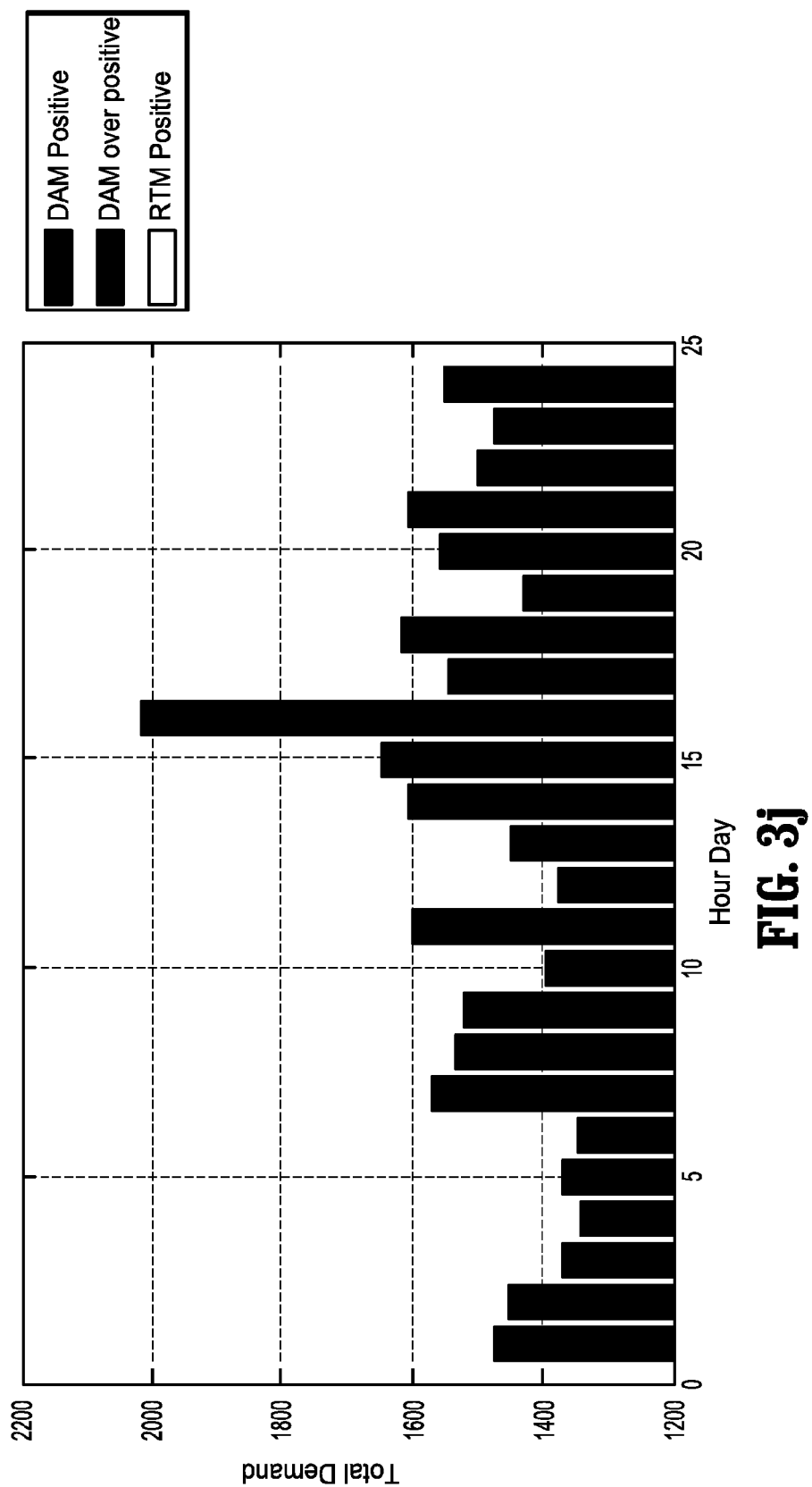
FIG. 3j is a chart of the DAM and RTM energy procurement costs used by a base case in a simulation comparison with the method of FIG. 2.

Given this demand profile, the base case will procure all its energy on the DAM as shown in FIG. 3j. Since no forecasts are involved there is no over-purchase in the DAM.

Figure 3K:
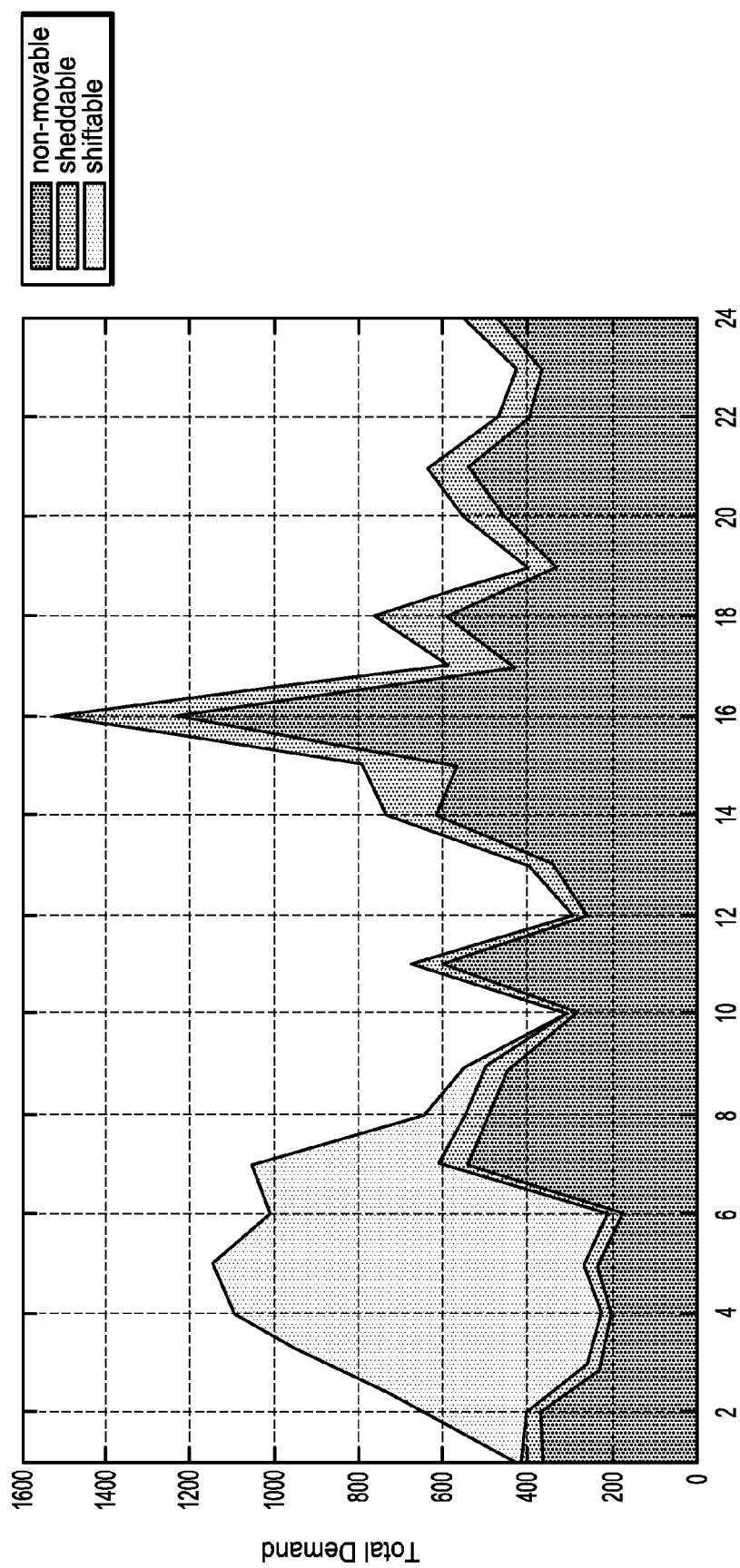
FIG. 3k is a chart of the demand profile resulting from the use of the method of FIG. 2 in a simulation comparison with a base case.
Figure 31:
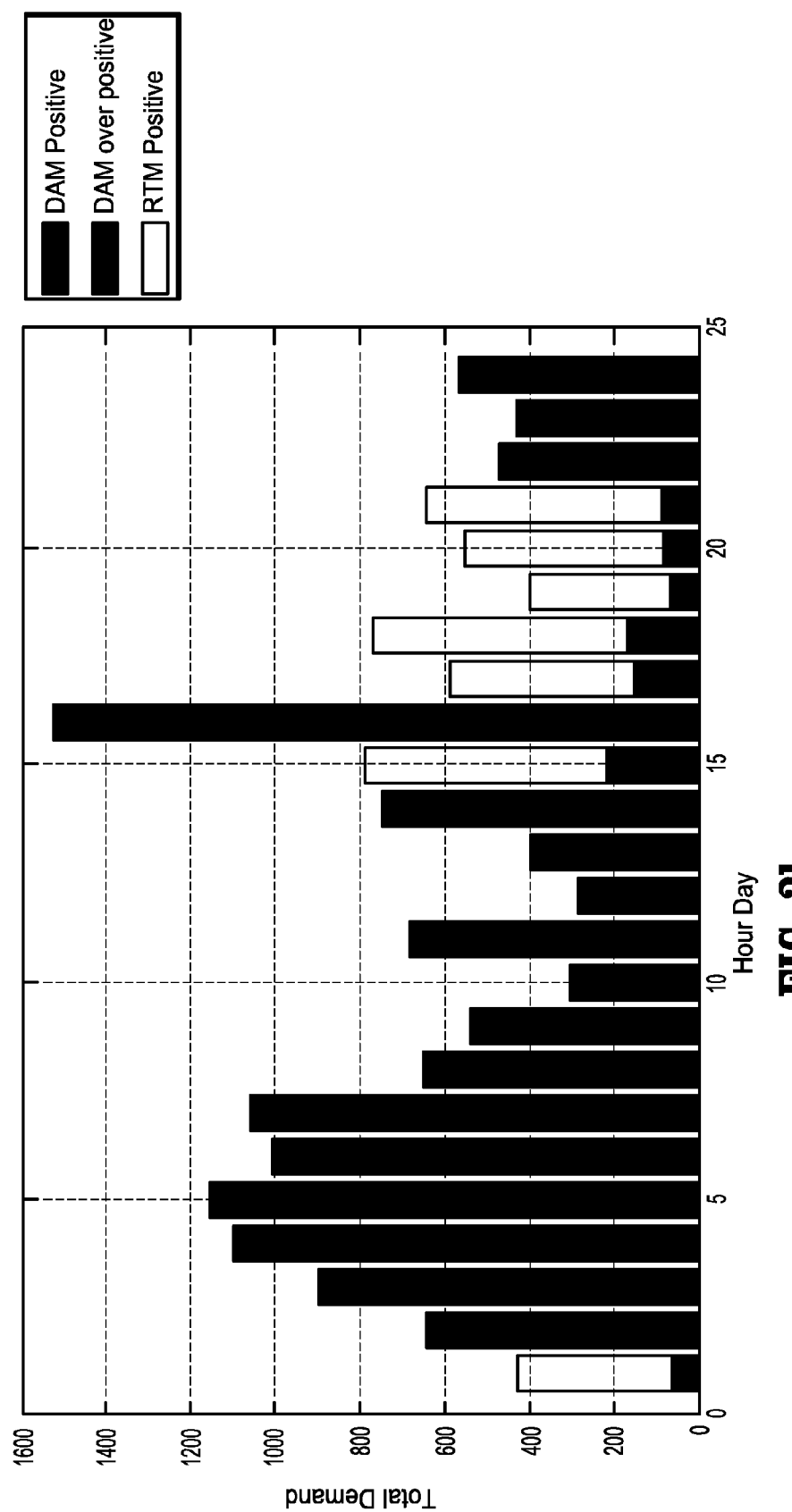

Finally, the utility ratio Y=1.2 is set for all the simulations to keep the same income ratio in the utility company. Then, the costs and billing rates for the base case are as follows:

Output of Base Case
Total Procurement Cost: $ 603087.81
Par: 2.6089
Flat Rate to Consumers: $ 38.54/unit The performance of the method 100 in simulation is now described. The method 100 is started with $b^f$ and $b_t^S$ equal to the billing rate computed in the base case and the initial value for $X_t$ equal to the shiftable demand $Q_t^{(s)}$. FIG. 3k shows the result of five (5) iterations of the method 100. When compared to FIG. 3i, it is clear that the method 100 moves the shiftable demand to the hours where the energy is cheaper and, when convenient, it also sheds some demand to reduce the energy procurement. FIG. 3l shows how the energy procurement is made. Since the method 100 can decide when to purchase part of the non-moveable demand, the procurement occurs in the RTM when the prices are lower than the DAM.

Finally, the following is the output of the method 100 in which there are several important things to note. First, the method 100 converges fairly quickly, in just five (5) iterations. Second, the equilibrium results in a solution that is more than 20% cheaper than the base case in terms of procurement costs while at the same time it reduces the billing rates to consumers for the sheddable and shiftable loads, as well as for most of the non-moveable demand, (except when the procurement prices are higher). This last benefit is achieved thanks to the important reduction in procurement costs. Finally, it is noted the PAR is also slightly reduced for this simulation. ioThis might not be the case every time, and it depends on how steep are the changes in prices and the amount of available shiftable demand. In any case, this at least shows that if the PAR is included in the objective it could result in a much better solution in terms of PAR.

Output of Method 100
Step 1—Total Cost: $ 471647.63
Step 2—Total Cost: $ 477478.68
Step 3—Total Cost: $ 477454.26
Step 4—Total Cost: $ 477454.09
Step 5—Total Cost: $ 477454.08
Total Procurement Cost: $ 477454.08
Improvement: 20.8317%
New Par: 2.2083
Flat Rate to Consumers (bf): $ 32.47/unit
Spot Rate to Consumers (bs):
24.8385
31.6698
31.6698
31.6698
31.6698
31.6698
31.6698
31.6698

31.6698
31.6698
31.6698
31.6698
31.6698
46.0320
31.6698
84.2850
43.1370
39.2160
36.6045
35.0310
31.6698
31.6698
31.6698

The present invention provides a modeling framework and a control method 100 (expressed in part as an optimization algorithm) for demand shaping through load shedding and shifting in a electrical smart grid. The present invention tackles the problem of controlling the flow of energy, for example, through demand shaping, in a much more general, and novel, framework than the current state of the art. First, unlike current mechanisms, the present invention considers two tools simultaneously for shaping the demand: shedding and shifting of load. Through direct load control the utility company will schedule/shift part of the demand and through price incentives it controls the level of load shedding. Additionally, the present invention considers the two-level market in which utility companies purchase their energy, the day-ahead market and the real-time market, which have different cost structures, and thus addresses the problem of how much energy to purchase on each to cover the demand. Finally, the different optimization sub-problems that must be solved are all posed in a robust optimization framework, allowing the present invention to accommodate the fact that both the final demand and the costs in the real-time market are unknown stochastic processes and not the deterministic values assumed by most of the literature. The final objective of the present invention is then to find the best shedding and shifting profile and how much energy to purchase in each market to satisfy the demand while minimizing costs.

Other modifications are possible within the scope of the invention. For example, the smart power network 10 may be a power sub-network connected to a larger utility power network or even a private power network. Also, the power network 10 and its components have been described in a simplified fashion and may each be constructed in various well-known manners and using various well-known components. Also, the control method 100 may be utilized by energy generators as well as energy distributers since energy generators also buy energy from the energy markets but they also generate it themselves with completely different cost structures.

Also, although the steps of the control method 100 have been described in a specific sequence, the order of the steps may be re-ordered in part or in whole and the steps may be modified, supplemented, or omitted as appropriate. Also, the power network 10 and the computer system 24 may use various well known algorithms and software applications to implement the steps and substeps. Further, the control method 100 may be implemented in a variety of algorithms and software applications.

What is claimed is:

1. A method for controlling the flow of energy in an electrical power grid, comprising:
    a. obtaining an optimal load shedding profile for a user of the grid;
    b. obtaining an optimal billing structure and an optimal load shifting profile for the user;
    c. iterating the steps of obtaining an optimal load shedding profile and obtaining an optimal billing structure and optimal load shifting profile until convergence is achieved; and
    d. controlling the energy consumption of the user based on the optimal load shedding profile, optimal billing structure, and optimal load shifting profile.

2. The method of claim 1, wherein obtaining an optimal load shedding profile utilizes a known billing structure and a known load shifting profile for each user of the grid.

3. The method of claim 2, wherein obtaining an optimal load shedding profile is performed without express information of load preferences of each user of the grid.

4. The method of claim 1, wherein each of obtaining an optimal load shedding profile and obtaining an optimal billing structure and an optimal load shifting profile is a solution to a robust convex optimization problem.

5. A method of controlling the energy demand of a user of an electrical power network, comprising:
    a. determining an optimal amount of user energy demand to shed and a price incentive required to achieve said optimal amount;
    b. determining a billing structure and an optimal amount of user energy demand to time-shift;
    c. repeating the first and second method steps until an equilibrium is achieved; and
    d. controlling the energy demand of the user based the determined optimal amount of user energy demand to shed, price incentive required to achieve said optimal amount, billing structure, and optimal amount of user energy demand to time-shift.

6. The method of claim 5, wherein determining the optimal amount of user energy demand to shed comprises formulating and solving an optimization problem using a known billing structure and a known user consumption for shiftable loads.

7. The method of claim 6, wherein formulating and solving comprises utilizing standard convex optimization techniques to solve the optimization problem in the case that energy price incentives are set by a party other than a network operator.

8. The method of claim 6, wherein formulating and solving comprises setting a price offer for the user and re-formulating and solving the re-formulated optimization problem with user preferences to load shedding in the case that energy price incentives are set by a network operator.

9. The method of claim 5, wherein determining a billing structure and an optimal amount of user energy demand to time-shift comprises formulating and solving an optimization problem based on results for calculating an optimal amount of user energy demand to shed and a price incentive required to achieve said optimal amount.

10. The method of claim 9, wherein formulating and solving comprises formulating and solving respective billing structures for each of user shiftable plus sheddable load and user non-moveable load using a fixed utility ratio.

11. The method of claim 10, wherein formulating and solving respective billing structures comprise re-formulating and solving re-formulated optimization problem to obtain an optimal amount of user energy demand to time-shift.

* * * * *